(12) United States Patent
Nishioka

(10) Patent No.: US 7,031,071 B2
(45) Date of Patent: Apr. 18, 2006

(54) OPTICAL DEVICE

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 47 days.

(21) Appl. No.: 10/413,209

(22) Filed: Apr. 15, 2003

(65) Prior Publication Data

US 2004/0109236 A1    Jun. 10, 2004

(30) Foreign Application Priority Data

Apr. 26, 2002    (JP) ............................. 2002-126020

(51) Int. Cl.
*G02B 15/14*    (2006.01)

(52) U.S. Cl. ...................................... 359/676; 359/683

(58) Field of Classification Search ................ 359/676, 359/683

See application file for complete search history.

(56) References Cited

U.S. PATENT DOCUMENTS

| | | | | |
|---|---|---|---|---|
| 5,585,940 A | * | 12/1996 | Seto ........................... | 358/438 |
| 5,828,501 A | | 10/1998 | Menard et al. ............. | 359/819 |
| 6,452,145 B1 | * | 9/2002 | Graves et al. ........... | 250/201.9 |
| 6,464,363 B1 | | 10/2002 | Nishioka et al. ............ | 359/846 |

FOREIGN PATENT DOCUMENTS

JP    2001-004809    1/2001

* cited by examiner

*Primary Examiner*—Scott J. Sugarman
(74) *Attorney, Agent, or Firm*—Kenyon & Kenyon LLP

(57) ABSTRACT

An optical apparatus includes an optical system for performing variable power by one lens group or integrated lens groups; a variable optical-characteristic element; a drive circuit for driving the variable optical-characteristic element; and a picture element, wherein the apparatus is constructed by providing a predetermined resolution chart with a known distance, feeding drive information to the variable optical-characteristic element in accordance with the distance, photographing images of the resolution chart, and adjusting and fixing the position of the picture element so as to substantially maximize the contrast of the images.

37 Claims, 32 Drawing Sheets

TRANS-TYPE                                   CIS-TYPE

OPTICAL DEVICE

BACKGROUND OF THE INVENTION

1. Field of the Invention

The present invention relates to an optical device having such a variable optical-characteristic element as a variable focal-length lens, a variable focal-length diffraction optical element, a variable deflection-angle prism, and a variable focal-length mirror, and having an optical system including the variable optical-characteristic element, which are eyeglasses, a video projector, a digital camera, a mobile-phone digital camera, an image pickup device of a PDA (personal digital assistant), an on-vehicle camera, a TV camera, a robot eye, an endoscope, a telescope, a camera finder, and an optical information processor, for example.

2. Description of the Related Art

A lens has been manufactured by polishing glass, and focusing, zooming, and variable power of a camera have been performed by moving a lens group in an optical axial direction via a complicated mechanism using a motor for example.

SUMMARY OF THE INVENTION

An optical apparatus according to the present invention comprises a variable optical-characteristic element; and a drive circuit for driving the variable optical-characteristic element, the optical apparatus having an image processing function, wherein enhancement is performed in accordance with a diffraction state and variations in aberration of an optical system.

Also, an optical apparatus according to the present invention comprises a movable optical element or optical element group; a motor driven by an electrostatic force for driving the optical element or optical element group; and a variable optical-characteristic element.

Also, a variable optical-characteristic element according to the present invention comprises a deformable film comprising a reflection surface for reflecting light and a substrate for supporting the reflection surface, wherein the substrate is meshed.

A manufacturing method of an optical apparatus comprising an optical system for performing variable power by one lens group or integrated lens groups; a variable optical-characteristic element; a drive circuit for driving the variable optical-characteristic element; and a picture element, the method according to the present invention comprises the steps of when an object having a known distance is arranged, feeding drive information to the variable optical-characteristic element in accordance with the distance; photographing images of the object; and adjusting and fixing the position of the picture element so as to substantially maximize the contrast of the images.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
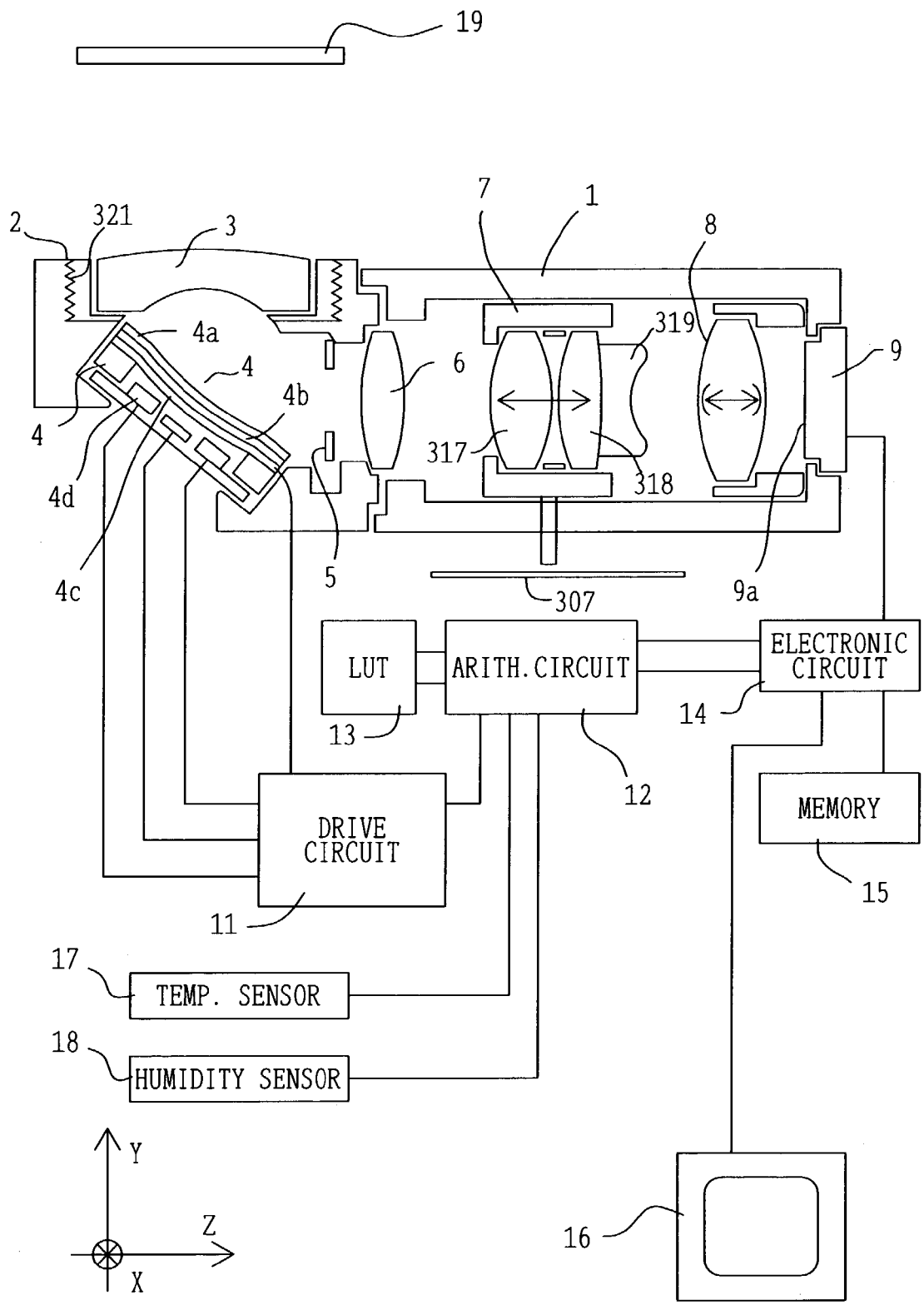
FIG. 1 is a schematic block diagram of an optical apparatus according to an embodiment of the present invention.

Prior to the description of an embodiment according to the present invention, contents of the invention described in this specification will be enumerated as follows:

(1) A manufacturing method or an adjustment method of an optical apparatus having a variable shape mirror comprises the steps of examining focus displacement by changing a zoom state after the adjustment according to Claim 1; finely adjusting a moving original point of a lens group so as to substantially minimize the difference to the focus displacement in design; photographing again an object having a known distance; changing drive information applied to the variable shape mirror so as to substantially maximize the contrast; memorizing the drive information at that time in a memory; and controlling the variable shape mirror with the memorized value. The present invention is also characterized by the optical apparatus manufactured by the above-manufacturing method.

(2) A manufacturing method or an adjustment method of an optical apparatus comprises the steps of examining focus displacement by changing a zoom state after the adjustment according to Claim 1; finely adjusting a moving original point of a lens group so as to substantially minimize the difference to the focus displacement in design; photographing again an object having a known distance; selecting drive information from an LUT (look-up table) for driving a variable shape mirror so as to substantially maximize the contrast; memorizing the drive information at that time in a memory; and controlling the variable shape mirror with the memorized value. The present invention is also characterized by the optical apparatus manufactured by the above-manufacturing method.

(3) A manufacturing method or an adjustment method of an optical apparatus having a variable shape mirror comprises the steps of examining focus displacement by changing a zoom state after the adjustment according to Claim 1; and finely adjusting a moving original point of a lens group so as to substantially minimize the difference to the focus displacement in design. The present invention is also characterized by the optical apparatus manufactured by the above-manufacturing method.

(4) In a manufacturing method or an adjustment method of an optical apparatus comprising an optical system for performing variable power by one lens group or integrated lens groups; a variable focus lens; a drive circuit for driving the variable focus lens; and a picture element, the method comprises the steps of when an object having a known distance is arranged, feeding drive information to the variable focus lens in accordance with the distance; photographing images of the object; and adjusting the position of the picture element so as to substantially maximize the contrast of the images; and adjusting and fixing the position of the picture element so as to substantially maximize the contrast of the images. The present invention is also characterized by the optical apparatus manufactured by the above-manufacturing method.

(5) A manufacturing method or a control method of an optical apparatus comprises the steps of examining focus displacement by changing a zoom state after the adjustment described in item (4); finely adjusting a moving original point of a lens group so as to substantially minimize the difference to the focus displacement in design; photographing again an object having a known distance; changing drive information applied to a variable focus lens so as to substantially maximize the contrast; memorizing the drive information at that time in a memory; and controlling the variable focus lens with the memorized value. The present invention is also characterized by the optical apparatus manufactured by the above-manufacturing method.

(6) A manufacturing method or a control method of an optical apparatus having a variable focus lens comprises the steps of examining focus displacement by changing a zoom state after the adjustment described in item (4); finely adjusting a moving original point of a lens group so as to substantially minimize the difference to the focus displacement in design; photographing an object having a known distance again; selecting drive information from an LUT for driving the variable focus lens so as to substantially maximize the contrast; memorizing the drive information at that time in a memory; and controlling the variable focus lens with the memorized value. The present invention is also characterized by the optical apparatus manufactured by the above-manufacturing method.

(7) A manufacturing method or a control method of an optical apparatus having a variable focus lens comprises the step of examining focus displacement by changing a zoom state after the adjustment described in item (4); finely adjusting a moving original point of a lens group so as to substantially minimize the difference to the focus displacement in design; photographing an object having a known distance again. The present invention is also characterized by the optical apparatus manufactured by the above-manufacturing method.

(8) In a manufacturing method or an adjustment method of an optical apparatus comprising an optical system for performing variable power by one lens group or integrated lens groups; a variable optical-characteristic element; a drive circuit for driving the variable optical-characteristic element; and a picture element, the method comprises the steps of when an object having a known distance is arranged, feeding drive information to the variable optical-characteristic element in accordance with the distance; photographing images of the object; and adjusting the position of the picture element so as to substantially maximize the contrast of the images. The present invention is also characterized by the optical apparatus manufactured by the above-manufacturing method.

(9) A manufacturing method or a control method of an optical apparatus having a variable focus lens comprises the steps of examining focus displacement by changing a zoom state after the adjustment described in item (8); finely adjusting a moving original point of a lens group so as to substantially minimize the difference to the focus displacement in design; photographing an object having a known distance again; changing drive information applied to the variable optical-characteristic element so as to substantially maximize the contrast; memorizing the drive information at that time in a memory; and controlling the variable optical-characteristic element with the memorized value. The present invention is also characterized by the optical apparatus manufactured by the above-manufacturing method.

(10) A manufacturing method or a control method of an optical apparatus having a variable optical-characteristic element comprises the steps of examining focus displacement by changing a zoom state after the adjustment described in item (8); finely adjusting a moving original point of a lens group so as to substantially minimize the difference to the focus displacement in design; photographing an object having a known distance again; selecting drive information from an LUT for driving the variable optical-characteristic element so as to substantially maximize the contrast; memorizing the drive information at that time in a memory; and controlling the variable optical-characteristic element with the memorized value. The present invention is also characterized by the optical apparatus manufactured by the above-manufacturing method.

(11) A manufacturing method or a control method of an optical apparatus having a variable optical-characteristic element comprises the step of examining focus displacement by changing a zoom state after the adjustment described in item (8). The present invention is also characterized by the optical apparatus manufactured by the above-manufacturing method.

(12) An optical apparatus according to Claim 2, wherein the stronger enhancement is performed along with increasing of an F-number of the optical system.

(13) An optical apparatus according to Claim 2, wherein the stronger enhancement is performed along with moving of a zoom state of the optical system from a wide-angle state to a telephoto state.

(14) An optical apparatus according to Claim 2, wherein the stronger enhancement is performed when a distance to an object is short.

(15) An optical apparatus comprises a variable shape mirror, a drive circuit for driving the variable shape mirror, and image processing means, wherein enhancement is performed in accordance with the shape of the variable shape mirror.

(16) An optical apparatus comprises a variable shape mirror, a drive circuit for driving the variable shape mirror, and image processing means, wherein enhancement is performed in accordance with the shape of the variable shape mirror by estimating the shape of the variable shape mirror from driving information of the variable shape mirror.

(17) An optical apparatus comprises a variable shape mirror, a drive circuit for driving the variable shape mirror, and image processing means, wherein different enhancement is performed on each part of images in accordance with symmetry of an optical system.

(18) An image pickup device comprises a variable shape mirror and a flash lamp, wherein a motor driven by an electrostatic force is used for driving a moving optical element or optical element group.

(19) An image pickup device comprises a variable shape mirror and a flash lamp, wherein a motor driven by an electrostatic force is used for driving a moving optical element or optical element group and a power supply used for in common to the motor, the variable shape mirror, or the flash lamp.

(20) An image pickup device comprises a variable shape mirror and an image pickup element, wherein shading is corrected by image processing.

(21) An image pickup device comprises a variable shape mirror, an image pickup element, and an decentered optical system, wherein shading is corrected with image processing.

(22) An image pickup device comprises a variable shape mirror and an optical element having an decentered image pickup element or an decentered imaging system, wherein shading is corrected by image processing.

(23) An image pickup device comprises a variable shape mirror, an image pickup element, and a zoom optical system, wherein shading is corrected by image processing.

(24) An image pickup device comprises a variable shape mirror and an image pickup element, wherein distortion of images is corrected by image processing.

(25) An image pickup device comprises a plurality of variable shape mirrors and an image pickup element, wherein distortion of images is corrected by image processing.

(26) An image pickup device comprises a plurality of variable shape mirrors and a zoom optical system having an image pickup element, wherein distortion of images is corrected by image processing.

(27) An image pickup device comprises a plurality of variable shape mirrors and a zoom optical system having a free-curved surface prism, wherein distortion of images is corrected by image processing.

(28) An image pickup device comprises a variable shape mirror and an image pickup element, wherein a closing-up lens and a cover for protecting an imaging optical system are detachably arranged in front of the imaging optical system.

(29) A variable shape mirror comprises a deformable film comprising a reflection surface for reflecting light and a substrate, wherein the substrate is meshed for reducing the rigidity of substrate portions other than the reflection surface.

(30) A variable shape mirror comprises a deformable film comprising a reflection surface for reflecting light and a substrate, wherein the substrate is meshed for reducing the rigidity of deformable substrate portions constituting electrodes.

(31) In a variable shape mirror described in (30), the deformable substrate portions are made of a metal.

(32) In a variable shape mirror described in (30), the deformable substrate portions are made of an organic conductor or an organic semiconductor.

(33) In an optical apparatus, an image pickup device, and a manufacturing method or a controlling method of the optical apparatus in claims 1 and 2, and items (1) to (32), a variable mirror is substituted for a variable shape mirror.

(34) In an optical apparatus, an image pickup device, and a manufacturing method or a controlling method of the optical apparatus in claims 1 and 2, and items (1) to (32), a mirror is substituted for a variable shape mirror.

(35) A variable mirror or a mirror comprises a deformable film comprising a reflection surface for reflecting light and a substrate, wherein the substrate is meshed for reducing the rigidity of substrate portions other than the reflection surface (corresponding to item (29)).

(36) A variable mirror or a mirror comprises a deformable film comprising a reflection surface for reflecting light and a substrate, wherein the substrate is meshed for reducing the rigidity of deformable substrate portions constituting electrodes (corresponding to item (30)).

(37) In a variable mirror or a mirror described in (36), the deformable substrate portions are made of a metal (corresponding to item (31)).

(38) In a variable mirror or a mirror described in (36), the deformable substrate portions are made of an organic conductor or an organic semiconductor (corresponding to item (32)).

FIG. 1 is a schematic block diagram of an optical apparatus, which is constructed as an electronic image pickup device, according to an embodiment of the present invention. In the drawing, numeral 1 denotes a lens barrel; numeral 2 denotes a holding frame connected to the lens barrel 1; numeral 3 denotes a concave lens attached to the holding frame 2; numeral 4 denotes a variable shape mirror, which will be described later, attached to the holding frame 2 so that the reflection surface thereof is held at an angle of substantial 45° relative to the optical axis of the concave lens 3; numeral 5 denotes a diaphragm; numeral 6 denotes a convex lens attached to the holding frame 2 along the optical axis of the luminous flux reflected by the variable shape mirror 4; numeral 7 denotes a variator lens attached to the lens barrel 1 movably along the optical axis of the convex lens 6; numeral 8 denotes an aspherical image-forming lens attached to the lens barrel 1; numeral 9 denotes an image pickup element attached to the lens barrel 1 so that the imaging surface 9a thereof is aligned with the focal point of the image-forming lens 8; and numeral 10 denotes an encoder for detecting the moving amount of the variator lens 7.

The variable shape mirror 4, as shown in the drawing, comprises a thin-film reflection surface 4a formed by aluminum coating, a deflectable base plate 4b for integrally supporting the reflection surface 4a, a deflectable electrode 4c formed integrally with the base plate 4b, and a plurality of electrodes 4d arranged on the back of the electrode 4c at intervals.

Figure 2:
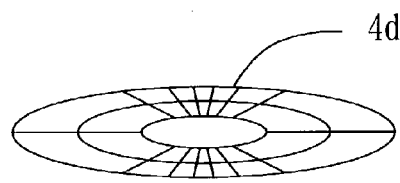
FIG. 2 is an explanatory view showing an embodiment of an electrode used in a variable shape mirror according to the embodiment shown in FIG. 1.
Figure 3:
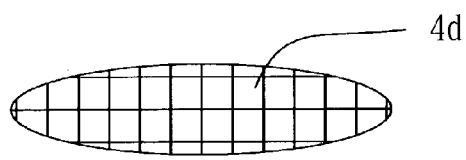
FIG. 3 is an explanatory view showing another embodiment of the electrode used in the variable shape mirror according to the embodiment shown in FIG. 1.
Figure 8:
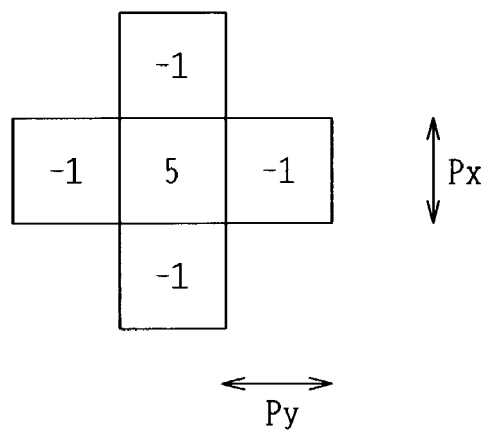
FIG. 8 is an explanatory view showing examples of a filter for enhancing and image convolution.

In a thin film constituting the reflection surface 4a, as a membrane mirror described in Handbook of Microlithography, Micromachining and Microfabrication compiled by P. Rai-choudhury and published by SPIE PRESS, Vol. 2: Micromachining and Microfabrication, p 495, FIG. 8.58; and Optics Communication, Vol. 140 (1997), p187 to 190, applying a voltage to between the plurality of electrodes 4d and the electrode 4c deflects the thin film by an electrostatic force so as to change the surface shape thereof, thereby not only being focusing-adjustable in accordance with the dioptor scale of an observer, but also restricting the reduction in an image-forming function due to the deflection and variations in a refractive index due to variations in temperature and humidity of the lenses 3 and 6 to 8, due to the expansion and cotraction of the lens barrel, or due to assembly errors of elements such as the optical element and the frame, so that the focusing adjustment and the aberration produced by the focusing adjustment can be appropriately corrected usually. The shape of the electrode 4d, as shown in FIGS. 2 and 3, may be selected in accordance with the deflection method of the reflection surface 4a.

The high-quality variable shape mirror 4 is easily obtained by using lithography because of high forming accuracy. Also, it is advantageous to form the base plate 4b by a synthetic resin such as polyimide, because it is largely deflectable by even low voltage.

Referring again to FIG. 1, numeral 11 denotes a drive circuit for controlling the deflection of the variable shape mirror 4; numeral 12 denotes an arithmetic unit; numeral 13 denotes an LUT (look-up table); numeral 14 denotes an electronic circuit for processing an image signal from the image pickup element 9; numeral 15 denotes a memory; numeral 16 denotes a TV monitor; numeral 17 denotes a temperature sensor; numeral 18 denotes a humidity sensor; and numeral 19 denotes a resolution chart placed at a predetermined position in front of the cover lens 3 as a test object.

According to the embodiment, a light ray from the object enters the lens 3 and is reflected by the variable shape mirror 4 so as to focus on the imaging surface 9a of the image pickup element 9 via the lens 6, the variator lens 7, and the image-forming lens 8, so that an image of the object is observed by the TV monitor 16 via the electronic circuit 14. Then, the variable power is performed by moving the variator lens 7 by a motor or manually. In this case, owing to the variable shape mirror 4, the focusing is performed along changes in the object distance and the focusing variation during the variable power is compensated, so that a clear object image can be constantly observed on the monitor screen.

That is, the shape of the reflection surface 4$a$ is controlled by the drive circuit 11 so that the image-forming function of the lens system comprising the lenses 3, 6, 7, and 8 is optimized based on a signal from the arithmetic unit 12. To the arithmetic unit 12, signals corresponding to the ambient temperature and humidity are entered from the temperature sensor 17 and the humidity sensor 18, so that the arithmetic unit 12 applies a voltage for determining the shape of the reflection surface 4$a$ to the electrodes 4$d$ via the drive circuit 11 so as to compensate the reduction in the image-forming function due to the ambient temperature and humidity based on the entered signals. In such a manner, since the reflection surface 4$a$ is deflected by the voltage applied to the electrodes 4$d$, i.e., the electrostatic force, the reflection surface 4$a$ may have various shapes including an aspheric surface according to situations.

In the description above, the voltage is used for driving the variable shape mirror 4; alternatively, an electric current or a fluid may be used instead of the voltage according to a driving system. In this application, theses are referred to as a driving source and the value thereof is referred to as driving information. The image-forming lens 8 may be made of any material such as glass, plastics, rubber, a synthetic resin, and an organic or inorganic hybrid material. Also, the lens barrel 1 may be made of a synthetic resin or a metal.

The optical apparatus according to the embodiment described above may be used for a TV camera, a digital camera, a PDA (personal digital assistant), an on-vehicle camera, a camcorder, a surveillance camera, and a robot eye. An adjustment method thereof after the assembling will be described below.

After the apparatus assembling, first, the variator lens 7 is located at a predetermined reference position. This position may be preferably selected so as to have an absolute value of 1 as the magnification of the variator lens 7 because of the fine adjustment. The image pickup element 9 picturizes the resolution chart 19 after applying a voltage corresponding to the distance to the resolution chart 19 (object distance) to the variable shape mirror 4 while being moved in the optical axial (Z-axial) direction so as to find the position that the focus or contrast of the chart image is optimized and to fix it.

Next, the voltage applied to the variable shape mirror 4 may be finely adjusted so as to maximize the focus or contrast of the chart image after the resolution chart 19 is again picturized, so that this value may be written in a memory such as $E^2$-PROM for use as the LUT 13. In such a manner, further accurate focusing can be performed and the photographing by referring to the value of the LUT 13 enables clear images to be constantly observed. If this adjustment operation is repeated by changing the distance to the resolution chart 19 several times, furthermore accurate focusing can be performed. The similar focusing may be performed by preparing several kinds of the resolution chart 19.

In order to finely adjust the voltage applied to the variable shape mirror 4, the optimum value in focusing may be selected from the LUT 13 prepared in advance, i.e., the address of the LUT 13 is memorized and the photographing may be performed by referring to the address.

Figure 4:
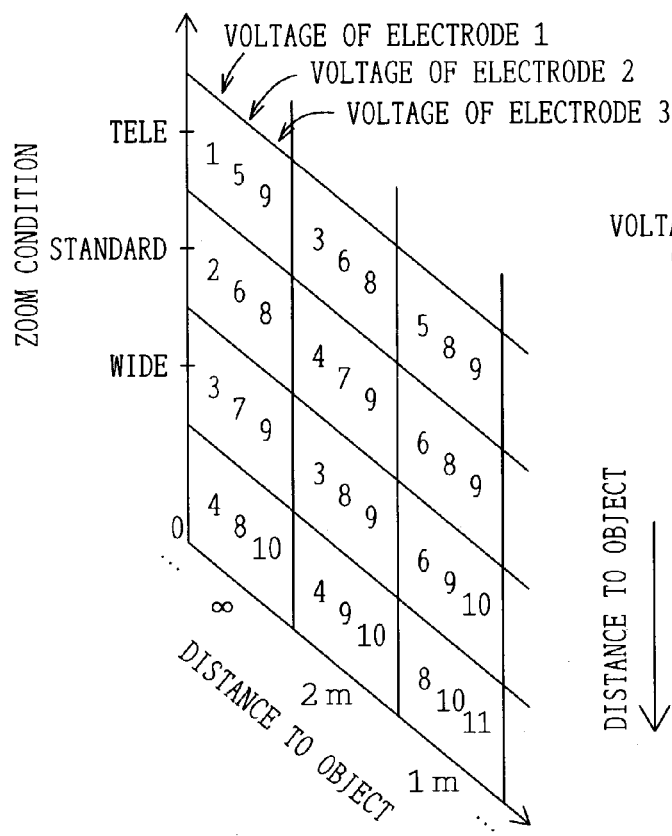
FIG. 4 is an explanatory view showing an example of an LUT used in the embodiment shown in FIG. 1.
Figure 5:
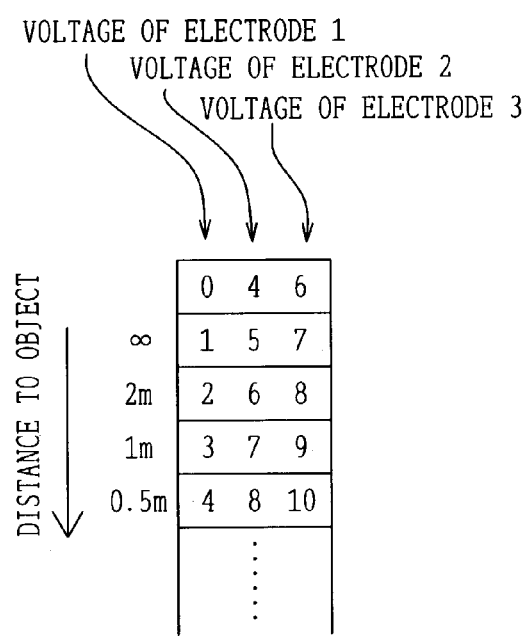
FIG. 5 is an explanatory view showing another example of the LUT used in the embodiment shown in FIG. 1.

FIGS. 4 and 5 show examples of the LUT 13: FIG. 4 shows an example having two axes for a zoom state and the distance to the object; FIG. 5 shows an example having one axis for the distance to the object.

The adjustment method described above may be used in the focusing adjustment of a single focus lens.

Next, an adjustment method different from the above will be described. In this method, the resolution chart 19 is fixed at a reference distance and the variable power is performed by moving the variator lens 7 in the Z-axial direction so that the compensation of focus variation with the variable shape mirror 4 when the distance to the object is changed is examined.

First, the variator lens 7 is moved so as to have an absolute value of 1 as the magnification of the variator lens 7 in design. The variable shape mirror 4 is driven by the driving information in that state. Then, the image pickup element 9 is moved in the Z-axial direction and located so as to have an optimum focus of the resolution chart 19 or a substantially maximum contrast thereof.

Next, the variator lens 7 is moved at the wide-angle end and at the telephoto end while the variable shape mirror 4 is driven by the drive information corresponding to the respective states so as to examine the focus movement at the time. In order to examine the focus movement, the position of the image pickup element 9 may be examined when the image pickup element 9 has an optimum focus by moving it back and forth.

Then, an original point for driving the variator lens 7 is slightly moved in the Z-axial direction so that the focus movements at the wide-angle end and at the tele-photo end approach designed movements. The movement of the variator lens 7 at this time is referred to as $\Delta Z$. The $\Delta Z$ becomes the correction amount of the variator lens 7 for the entire zoom states.

After the position of the variator lens 7 is adjusted in such a manner, the driving information of the variable shape mirror 4 is optimized so that the focus or contrast of the resolution chart 19 is substantially optimized for each combination between the zoom state and the distance to the object so as to write these data in the LUT 13. Then, the imaging in practice may be performed according to the LUT 13. Alternatively, instead of the writing the optimum information in the LUT 13, by selecting the optimum value corresponding to each state from the LUT 13 having the data calculated in advance, the address may be stored in a ROM or the like.

When the zoom state and the distance to the object are known, the imaging is performed by referring to the LUT via the ROM. The imaging by manual focusing is an example of such a case.

In the case where the distance to the object is not known even if the zoom state is known, the imaging is performed by driving the variable shape mirror 4 while the LUT 13 is referred, so that the imaging may be performed by selecting the value of the LUT 13 therefrom, by which the object image is optimized. The imaging by auto-focusing corresponds to this case.

The adjustment method for the one-group zoom described above may be applied to an optical-correction type zooming optical system, which will be described below.

Figure 6:
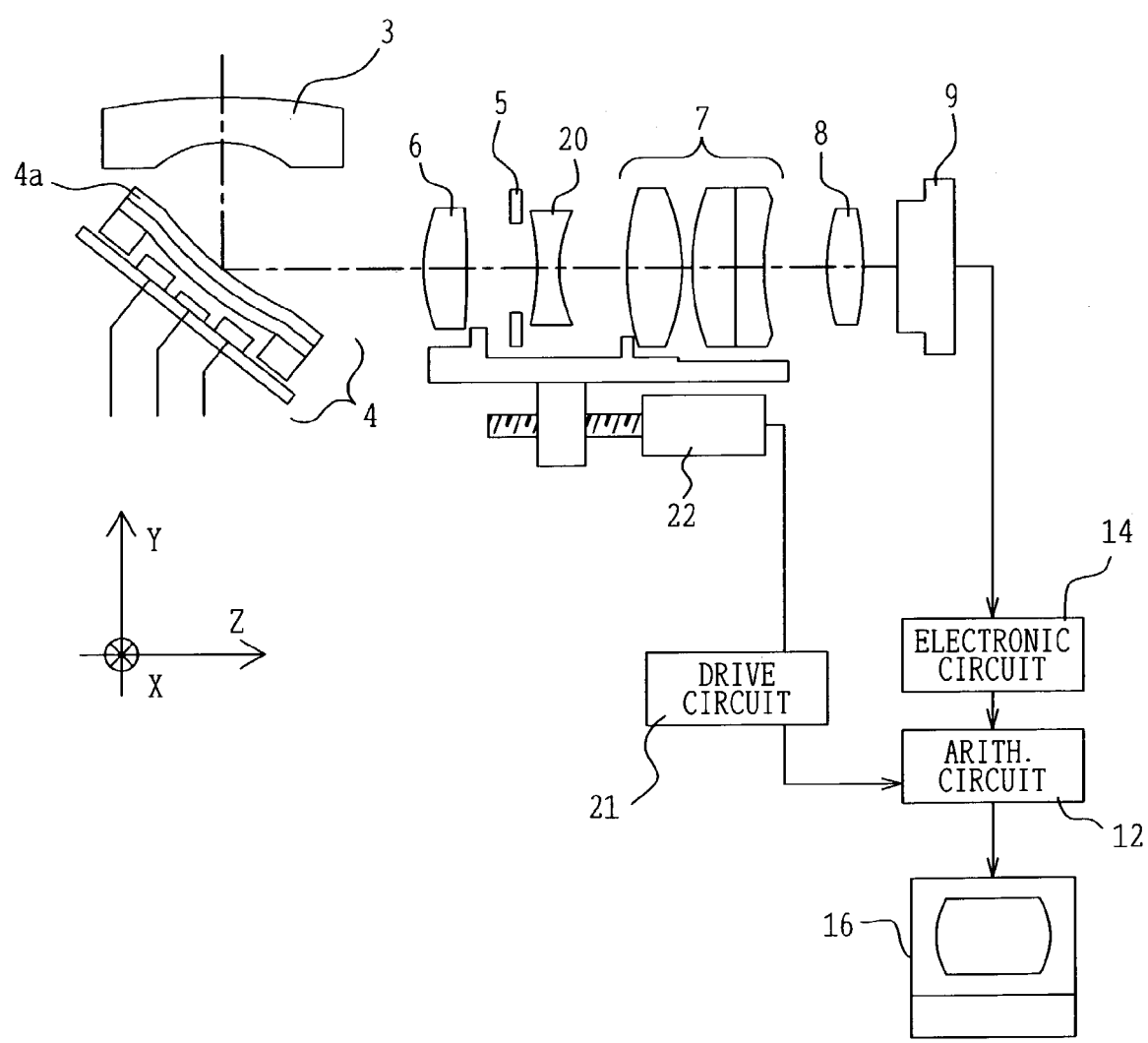
FIG. 6 is a schematic block diagram of an optical apparatus according to another embodiment of the present invention.

FIG. 6 shows an example of such a zooming optical system. This example is constructed so that the lens 6 and the variator lens 7 are integrally moved with the diaphragm 5 and a fixed lens 20 therebetween. That is, the lens 6 and the variator lens 7 are held in a common lens barrel, and this lens barrel is to be driven by a stepping motor 22 that is driven by a drive circuit 21 controlled by the arithmetic unit 12.

The above cases have been described by incorporating the present invention to the optical apparatus as the image pickup device; however, by not applying only to these, the present invention may be applied to various optical apparatuses such as an observing apparatus using a variable shape mirror, a display, an optical communication apparatus, and an optical information processing apparatus.

Figure 7:
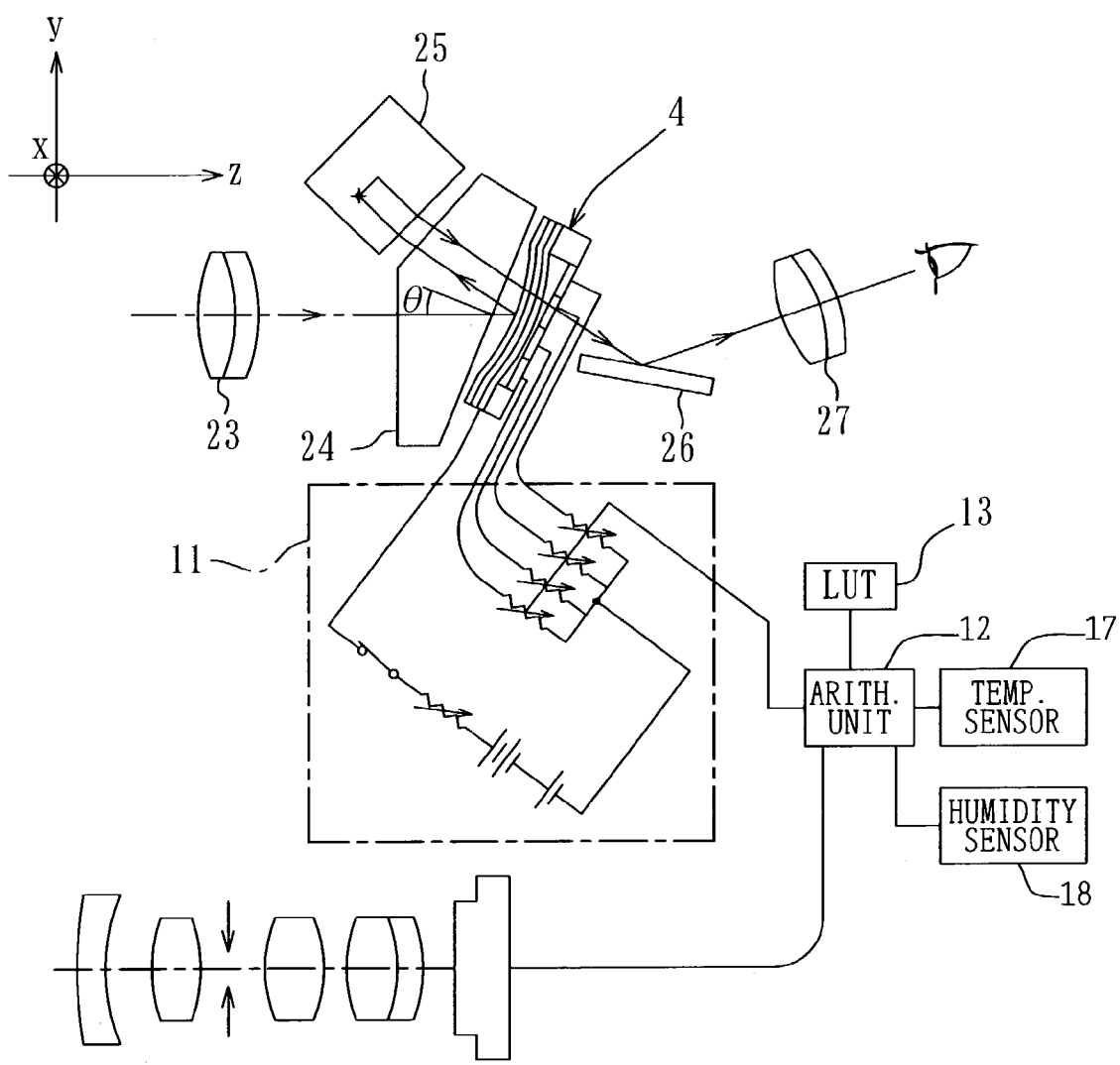
FIG. 7 is a schematic block diagram of an optical apparatus according to still another embodiment of the present invention.

For example, in the case of a finder shown in FIG. 7, the dioptor shift due to variations in temperature and humidity or manufacturing errors can be corrected by reading the LUT 13 for driving the variable shape mirror while it is shifted in the distance direction to the object. FIG. 5 shows this example of the LUT. In addition, in FIG. 7, the light ray from the object is refracted by the respective incident surfaces and emission surfaces of an objective lens 23 and a prism 24; reflected by the variable shape mirror 4; allowed to pass through the prism 24; further reflected by an isosceles-rectangular prism 25 (in the light path shown in the drawing, symbol + indicates that the light ray proceeds to the back of the page); and reflected by a mirror 26 so as to enter an eye via an eyepiece 27.

In the above-description, the entire examples have been exemplified by the variable shape mirror 4; however, the correction method, the adjustment method, and the control method of these examples may be applied to a variable optical-characteristic element such as a variable focus lens, which will be described later, in the exact same manner.

The LUT used therein may be a numerical table in a memory or may be a function having several arguments as long as the value can be read from the argument.

Next, an MTF (modulation transfer function) of an electronic imaging system will be described with reference to FIG. 6 again. Along with the zooming, an F-number for the variator lens 7 changes. In almost cases, the F-number at the tele-photo end is darker than that at the wide-angle end. However, if the F-number becomes dark, the MTF is reduced because of light diffraction. This effect is conspicuous especially if one pixel size of the image pickup element 9 is 4 μm or less. Hence according to the present invention, the reduction in the MTF is corrected by increasing the enhancement applied to images along with the reduction in the MTF. According to the embodiment, the image information obtained from the image pickup element 9 is digitized in the electronic circuit 14 and enhanced in the arithmetic unit 12 having an image processing function.

Figure 9:
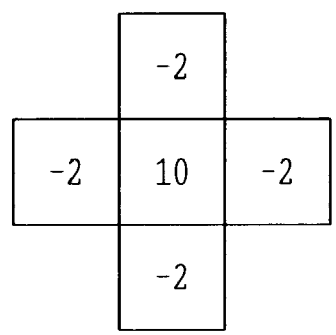
FIG. 9 is an explanatory view showing other examples of a filter for enhancing and image convolution.

At this time, from the information about the state of the zoom lens obtained from the drive circuit 21, an F-number is calculated in the arithmetic unit 12 and the optimum enhancement corresponding to the F-number is applied thereto. In order to apply the enhancement, convolutions between a filter and images shown in FIG. 8 may be taken, for example. In the drawing, symbols $P_x$ and $P_y$ denote sizes of one-pixel. In order to apply the stronger enhancement, convolutions to the filter shown in FIG. 9 may be taken, for example.

While the MTF of the optical system is changed by the F-number, it is also changed by the aberration of the optical system including the variable shape mirror 4. The MTF is generally liable to be reduced especially when the deflection of the reflection surface 4a from a plane is large. Hence excellent images can be obtained by adjusting the application of the enhancement corresponding to the shape of the reflection surface 4a. Since the deflection of the variable shape mirror 4 can be known from the drive information, the referenced LUT, for example, may be examined. In the case of an electrostatic variable-shape mirror, the deflection may increase at close range. Therefore, if the object is located at the close range, the enhancement may be preferably strongly applied. Also, depending on the shape of the reflection surface 4a, there may be a case where the value of the MTF is largely different in the center of images. In this case, the different enhancement may be applied thereto for each position of the images.

Figure 10:
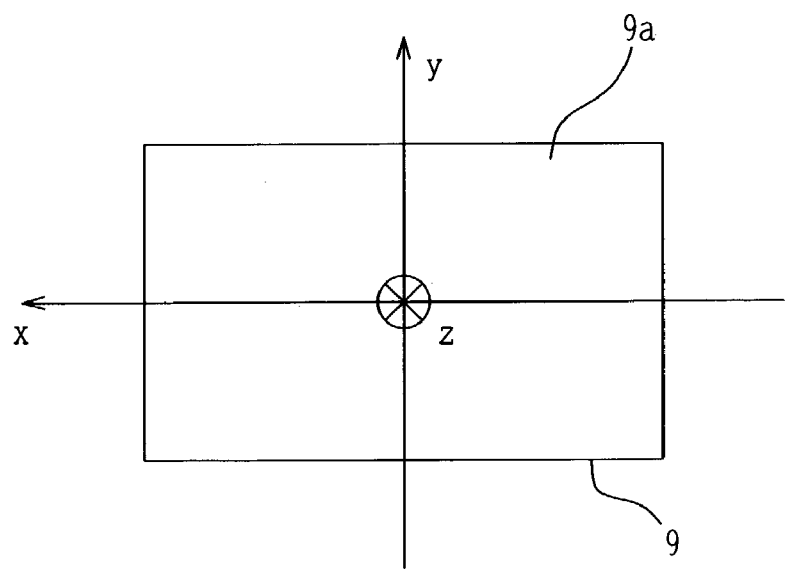
FIG. 10 is a drawing showing a shape of an image pickup element viewed in the Z-axial direction.

FIG. 10 shows a shape of the image pickup element 9 viewed in the Z-axial direction; in this case, the optical system is symmetrical with respect to a Y-Z plane, so that the enhancement may also be symmetrically applied with respect to a Y-axis. That is, the enhancement may be applied in accordance with the symmetry of the optical system including the image pickup element. The enhancement according to this application is referred to as the entire image processing for improving image resolution or contrast.

Figure 11:
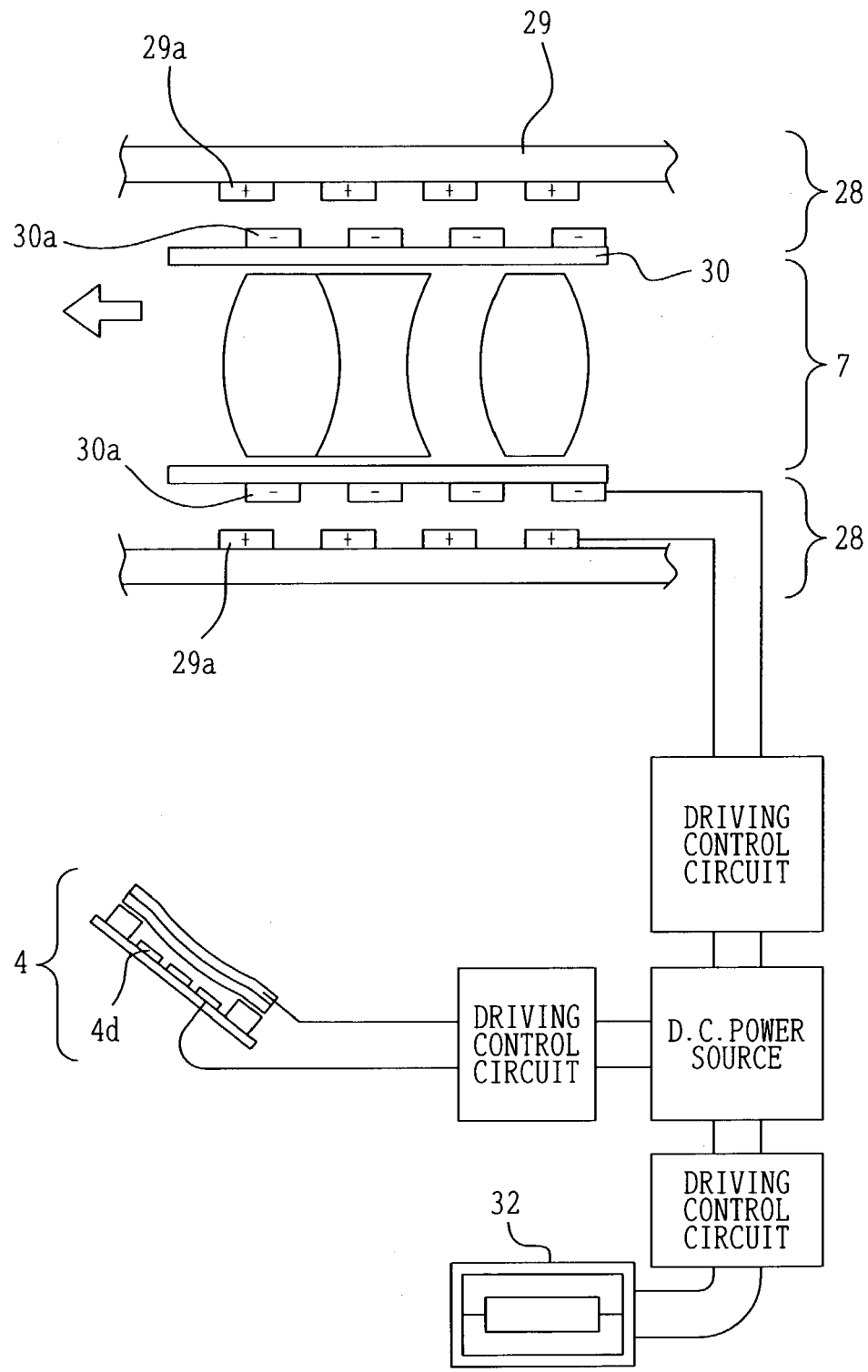
FIG. 11 is a schematic block diagram of an optical apparatus according to still another embodiment of the present invention.

Next, an example of a driving method for an optical element group in an optical system having a moving lens group or optical element group shown in FIG. 1 or 6 will be described. FIG. 11 shows an example using a motor 28 driven by an electrostatic force, in which a plurality of electrodes 29 are arranged on the internal surface of a fixed frame 29 while a plurality of electrodes 30a are arranged on the external surface of a movable lens barrel 30. The electrodes 29a and 30a, as shown in the drawing, are arranged so as to be out of phase in a normal state, so that if a voltage with opposition sign is applied thereto, the lens barrel 30 is pulled by an electrostatic attractive force in arrow direction (on the left). Then, by changing a voltage sign applied to the electrodes 29a and 30a along with the movement of the lens barrel 30, the lens barrel 30 can be driven.

A high-voltage DC power supply 31 is required for driving the motor 28, and it can be combined-used with a power supply for driving the variable shape mirror 4 and a power supply for driving a flash lamp 32. Numeral 33 denotes a drive control circuit of the motor 28; numeral 34 denotes a drive control circuit of the variable shape mirror 4; and numeral 35 denotes a drive control circuit of the flash lamp 32. In practice, a DC power supply with a voltage in the range of several tens V to several hundreds V is required for driving the variable shape mirror 4, the motor 28, and the flash lamp 32, so that the combined use is advantageous in cost, size, and weight.

Even when the motor 28 is not used, using the power supply in common for the variable shape mirror 4 and the flash lamp 32 has the similar advantage to the above. Also, the flash lamp described in the present invention refers to a general auxiliary light source for photography.

Figure 12:
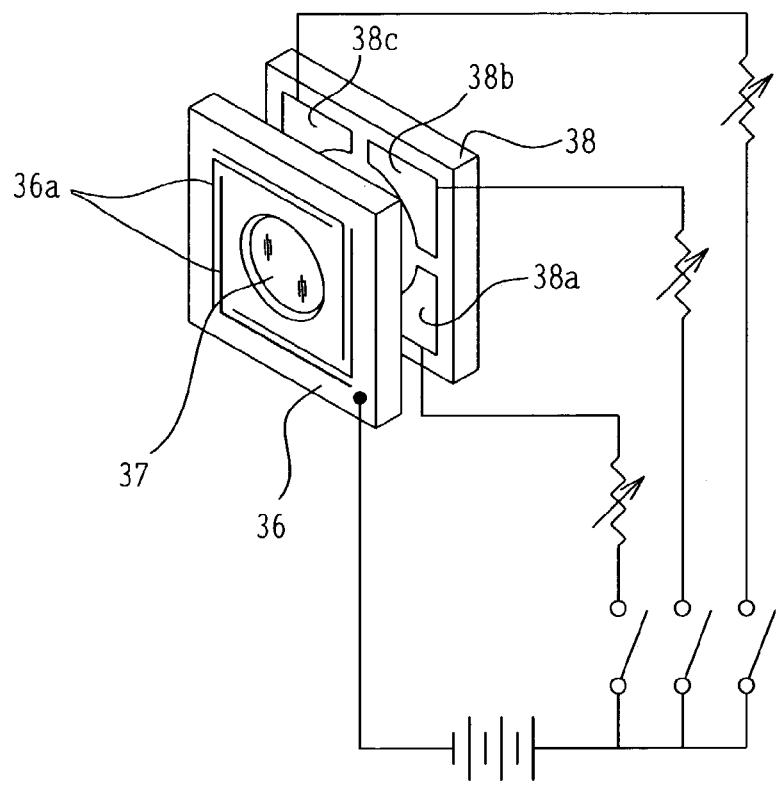
FIG. 12 is a schematic block diagram of an optical apparatus according to still another embodiment of the present invention.

FIG. 12 shows a different example of a motor driven by an electrostatic force. In the drawing, numeral 36 denotes a leaf spring having partial slits 36a penetrated therethrough and a lens 37 fixed at the center and serving also as an electrode; and numeral 38 denotes an insulating plate arranged close to the leaf spring 36 and in parallel therewith and having electrodes 38a, 38b, and 38c defined in the periphery of an opening aligned with the lens 37. Between the leaf spring 36 and the electrodes 38a, 38b, and 38c, DC voltages different from each other are applied. Therefore, both the electrodes are pulled to each other by the electrostatic force so that the lens 37 can be moved. The advantages are the same as those of the example shown in FIG. 11. In addition to the example of FIG. 12, a comdrive made by a micromachining technique is also an example of the motor driven by the electrostatic force. Also, the comdrive is disclosed on page 257 of "MEMS and MOEMS Technology and Applications" (ALPTE press).

As mentioned above, the motor driven by the electrostatic force in the present invention refers to a ceneral actuator that the optical element can be actuated by static electricity.

Figure 13:
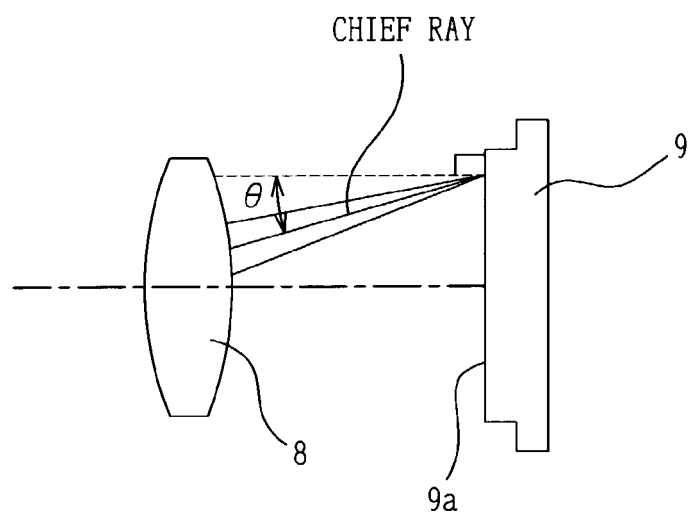
FIG. 13 is an explanatory view showing changes in angle of incident light in an image pickup element due to a zooming state.

Next, electric shading correction will be described by exemplifying the optical apparatus shown in FIG. 6. In the zoom optical system as shown in FIG. 6, an angle θ (see FIG. 13) of light incident on the image pickup element 9 changes along with the zooming state. This angle θ may be changed by the distance to the object, or it may also be changed when the deflection of the variable shape mirror 4 is large (5 μm or more). Therefore, the sensitivity is reduced especially in the periphery on an image reception area 9a of the image pickup element 9. That is, there are disadvantages that the shading is changed by the zooming state.

Then, in order to cope with the changes in the shading, lightness correction process may be performed on images picturized by the image pickup element 9 in the arithmetic unit 12. Since the periphery of images by the image pickup element 9 may become dark in almost cases, the gain may be increased toward the periphery. Such a shading process may be of course performed on the single focus optical system by not applying only to the zoom optical system.

Also, the optical apparatus shown in FIG. 6 becomes an axial asymmetrical optical system if the variable shape mirror 4 caves in so that decentered aberration is produced. In order to correct this decentered aberration, for example, the lens 3 may be slightly (0.02 mm to 1 mm) moved in the Z-axial direction; the lens 3 may be slightly (0.05° to 5°) rotated about the X-axis; or the image pickup element 9 may be slightly (0.5° to 8°) rotated about the X-axis. In any case, the shading asymmetrical with respect to the optical axis is produced. Also, in this case, the shading correction process may be performed on images picturized by the image pickup element 9 in the arithmetic unit 12. In this case, since the shading is symmetrical with respect to the Y-axis, the correction symmetrical with respect to the Y-axis and asymmetrical with respect to the X-axis may be performed thereon. That is, the correction may be performed corresponding to the symmetry of the optical system including the image pickup element.

The examples of the shading with the image processing have been described above; alternatively, the correction may be performed in an analogue fashion using an electronic circuit. Since this method requires a short time for the correction, it may also be used in moving images.

Figure 14:
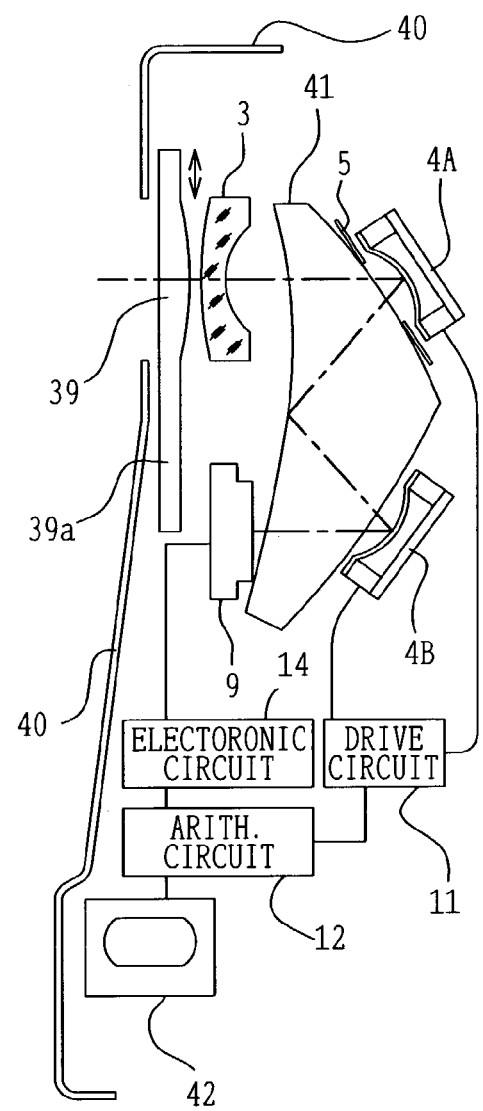
FIG. 14 is a schematic block diagram of an optical apparatus according to still another embodiment of the present invention.

FIG. 14 shows an example of a zoom image pickup device using two variable shape mirrors 4A and 4B. In the drawing, numeral 39 denotes a closing-up auxiliary lens slidably attached inside a casing wall 40 of the image pickup device and having a plate portion 39a; numeral 41 denotes a free-curved surface prism; and numeral 42 denotes a liquid crystal displaying element.

In this example, in the telephoto state, power of the image pickup element 4A is strong while power of the image pickup element 4B is weak; in the wide-angel state, power of the image pickup element 4A is weak while power of the image pickup element 4B is weak, wherein plus-minus signs are also taken into account of the power.

Therefore, there is a disadvantage that variation in the zoom state changes distortion. Then, according to the embodiment, the distortion is corrected by image processing with the arithmetic unit 12.

Figure 15:
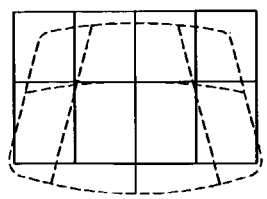
FIG. 15 is an explanatory view showing image distortion when a grid chart is picturized by an image pickup device shown in FIG. 14.

FIG. 15 shows the images of a grid chart picturized by the image pickup device shown in FIG. 14, wherein the shape is indicated by broken lines and barreled and trapezoid distortions are produced. These distortions may be preferably corrected to have the shape indicated by solid lines of FIG. 15 by image processing with the arithmetic unit 12. Alternatively, the distortion may be corrected in accordance with the symmetry of the optical system. Such correction of the distortion by image processing may be applied to other embodiments of the present invention.

The closing-up auxiliary lens 39 may be preferably used for focusing a device at a near point in the case where the deflection in the variable shape mirrors 4A and 4B is small. That is, in the normal imaging, the auxiliary lens 39 may be moved out of an optical path while in the closing up, it may be returned to the optical path so as to use for imaging. Also, in order to protect the lens 3 during the normal imaging, it is more preferable that the plate portion 39a be brought into the optical path. Such examples may of course be applied to other embodiments of the present invention.

Figure 16:
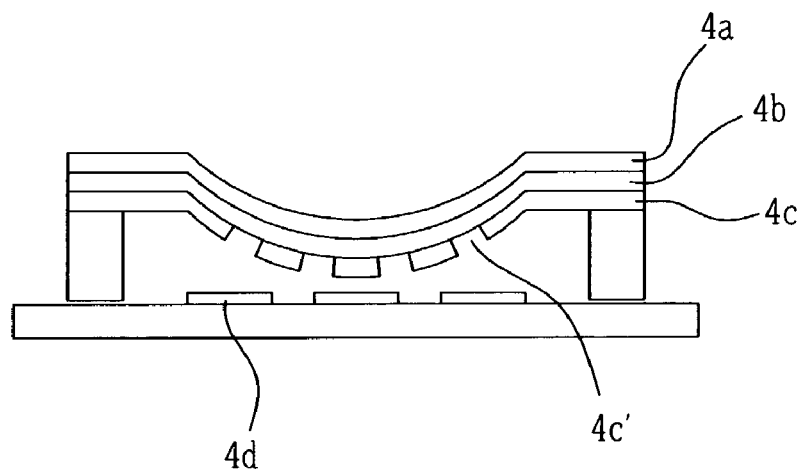
FIG. 16 is a schematic block diagram of a variable shape mirror according to another embodiment.
Figure 17:
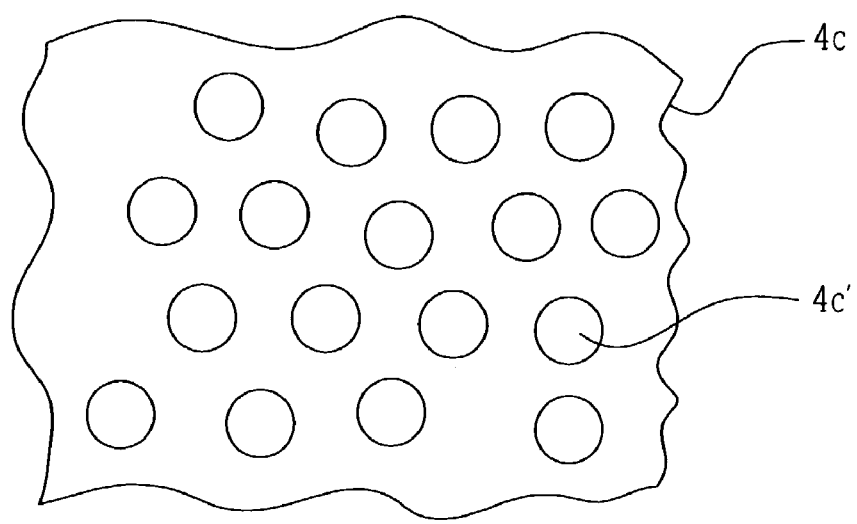
FIG. 17 is an explanatory view showing a shape of an electrode of the variable shape mirror shown in FIG. 16.

FIG. 16 shows another example of the variable shape mirror 4 used in the embodiment of the present invention. In a variable shape mirror of the type, the lower driving voltage may be preferable because of easy design of a drive circuit and lower cost. Therefore, in this example, the electrode 4c has a meshed structure with a number of holes 4c' so as to reduce the rigidity of deflecting film including the reflection surface 4a and the base plate 4b. FIG. 17 shows a shape of the electrode 4c viewed from the electrode 4d.

In such a manner, in order to reduce the rigidity of the film, film components not used for reflecting light may be meshed. Therefore, the base plate 4b may be also meshed. The electrode 4c may also have cavities instead of penetrated holes. Alternatively, any portion of the reflection surface 4a, the base plate 4b, and the electrode 4c, through which luminous flux does not pass, may be meshed. After all, providing thin portions enables the rigidity to be reduced. If the electrode 4c is made of a metal such as titanium, it can be conveniently fabricated by lithography. If the electrode 4c is made of an organic conductor or an organic semiconductor, the rigidity can preferably be further reduced. In this case, the base plate 4b and the electrode 4c may be also fabricated from one common material, so that it is advantageous to have simplified fabrication. If the base plate 4b is made of a synthetic resin such as polyimide, the rigidity can preferably be reduced.

In the embodiments described above, fabricating the lenses 3, 6, 7, 8, 20, 23, 27, 37, and 39; the prisms 24, 25, and 41; and the mirror 26 with plastic molds enables an arbitrary desired-shaped curved surface to be readily formed, and the fabrication is also easy. Part of or these entire components may also be made of glass, thereby further improving accuracies of the imaging apparatus. Also, the shape of the reflection surface 4a may preferably be a free-formed surface because of the correction easiness of aberration.

The free-formed surface used in the present invention is defined by the following equation. The Z axis in this defining equation constitutes an axis of the free-formed surface.

$$Z = cr^2 / \left[1 + \sqrt{\{1-(1+k)c^2r^2\}}\right] + \sum_{j=2}^{M} C_j X^m Y^n \qquad (a)$$

where, the first term of this equation is a spherical surface term, and the second term is a free-formed surface term. M is a natural number of 2 or larger.

In the spherical surface term,
c: curvature of the vertex,
k: conic constant,
$r=\sqrt{(X^2+Y^2)}$ The free-formed surface term is as follows:

$$\sum_{j=2}^{M} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 +$$
$$C_{17} X^4 Y + C_{18} X^3 Y^2 + C_{19} X^2 Y^3 + C_{20} XY^4 +$$
$$C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 +$$
$$C_{29} X^7 + C_{30} X^6 Y + C_{31} X^5 Y^2 + C_{32} X^4 Y^3 +$$
$$C_{33} X^3 Y^4 + C_{34} X^2 Y^5 + C_{35} XY^6 + C_{36} Y^7 \dots$$

where, $C_j$ (j is an integer of 2 or larger) is a coefficient.

The above-mentioned free-formed surface never generally has a symmetric surface for both the X-Z plane and the Y-Z plane. However, by bringing all odd-number order terms of X to 0, a free-formed surface having only one symmetrical surface parallel to the Y-Z plane is obtained. By bringing all odd-number order terms of Y to 0, a free-formed surface having only one symmetrical surface parallel to the X-Z plane is obtained.

Subsequently, reference is made to the structural examples of variable optical-property elements (for example, deformable mirrors and variable focal-length lenses) applicable to the image pickup device or the optical apparatus in the present invention.

Figure 18:
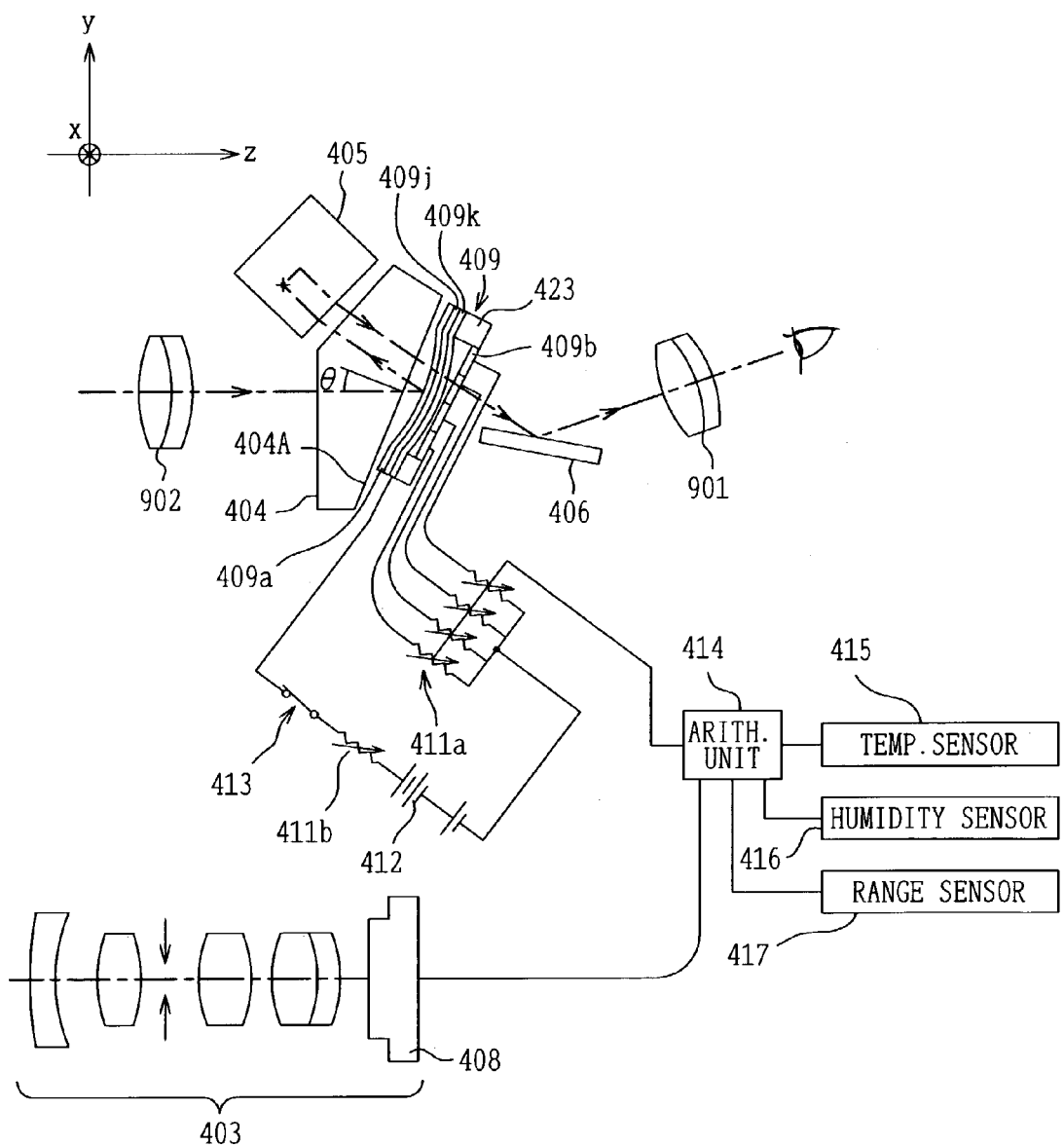
FIG. 18 is a diagram schematically showing a Keplerian finder for a digital camera used as the optical apparatus which is an observation optical system in which a deformable mirror is used.

FIG. 18 shows a Keplerian finder for a digital camera using a variable optical-property mirror as a variable mirror applicable to the zooming optical system of the present invention. It can, of course, be used for a silver halide film camera. Reference is first made to a variable optical-property mirror 409.

The variable optical-property mirror 409 refers to a variable optical-property deformable mirror (which is hereinafter simply called a deformable mirror) in which the periphery of the deformation layer of a three-layer structure including an electrode k, a deformable substrate 409j, and a thin film (reflecting surface) 409a, functioning as a reflecting surface, coated with aluminum on the substrate 409j is fixed on a support 423, and a plurality of electrodes 409b provided in spaced relation with respect to the electrode 409k are fixed on the lower side of the support 423. Reference numeral 411a denotes a plurality of variable resistors connected to the electrodes 409b; 412 denotes a power supply connected between the electrode 409k and the electrodes 409b through a variable resistor 411b and a power switch 413; 414 denotes an arithmetical unit for controlling the resistance values of the plurality of variable resistors 411a; and 415, 416, and 417 denote a temperature sensor, a humidity sensor, and a range sensor, respectively, connected to the arithmetical unit 414, which are arranged as shown in the figure to constitute one optical apparatus.

Each of the surfaces of an objective lens 902, an eyepiece 901, a prism 404, an isosceles rectangular prism 405, a mirror 406, and the deformable mirror 409 need not necessarily be planar, and may have any shape such as a spherical or rotationally symmetrical aspherical surface; a spherical, planar, or rotationally symmetrical aspherical surface which has decentration with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface. Also, the decentration means either displacement (shift) or tilt, or both.

The thin film 409a, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187–190, 1997, is such that when voltages are applied between the plurality of electrodes 409b and the electrode 409k, the thin film 409a is deformed by the electrostatic force and its surface profile is changed. Whereby, not only can focusing be adjusted to the diopter of an observer, but also it is possible to suppress deformations and changes of refractive indices, caused by temperature and humidity changes of the lenses 902 and 901 and/or the prism 404, the isosceles rectangular prism 405, and the mirror 406, or the degradaiton of imaging performance by the expansion and deformation of a lens barrel and assembly errors of parts, such as optical elements and frames. In this way, a focusing adjustment and correction for aberration produced by the focusing adjustment can be always properly made.

Figure 20:
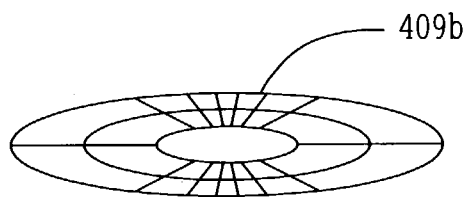
FIG. 20 is an explanatory view showing one aspect of electrodes used in the example of FIG. 19.
Figure 21:
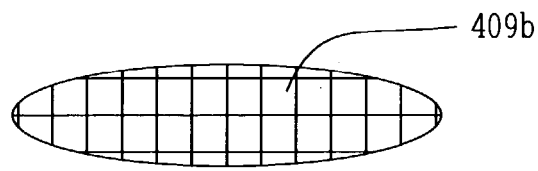
FIG. 21 is an explanatory view showing another aspect of electrodes used in the example of FIG. 19.

Also, it is only necessary that the profile of the electrodes 409b, for example, as shown in FIG. 20 or 21, has a concentric or rectangular division pattern and is selected in accordance with the deformation of the thin film 409a.

When the deformable mirror 409 is used, light from an object is refracted by the entrance and exit surfaces of the objective lens 902 and the prism 404, and after being reflected by the deformable mirror 409, is transmitted through the prism 404. The light is further reflected by the isosceles rectangular prism 405 (in FIG. 18, a mark + on the optical path indicates that a ray of light travels toward the back side of the plane of the page), and is reflected by the mirror 406 to enter the eye through the eyepiece 901. As mentioned above, the lenses 901 and 902, the prisms 404 and 405, and the deformable mirror 409 constitute the observation optical system of the optical apparatus. The surface profile and thickness of each of these optical elements is optimized and thereby aberration of an object surface can be minimized.

Specifically, the configuration of the thin film 409a functioning as the reflecting surface is controlled in such a way that the resistance values of the variable resistors 411a are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In order to compensate for the degradation of imaging performance due to the ambient temperature and humidity and the distance to the object in accordance with these input signals, the arithmetical unit 414 outputs signals for determining the resistance values of the variable resistors 411a so that voltages by which the configuration of the thin film 409a is determined are applied to the electrodes 409b. Thus, since the thin film 409a is deformed with the voltages applied to the electrodes 409b, that is, the electrostatic forces, it assumes various shapes including an aspherical surface, according to circumstances. The range sensor 417 need not necessarily be used, and in this case, it is only necessary that an imaging lens 403 constructed as the imaging optical system of the digital camera is moved so that a high-frequency component of an image signal from a solid-state image sensor 408 is roughly maximized, and the object distance is calculated from this position so that an observer's eye is able to focus upon the object image by deforming the deformable mirror. When the deformable mirror 409 is made by using lithography, high fabrication accuracy and good quality are easily obtained.

When the deformable substrate 409*j* is made of synthetic resin, such as polyimide, it can be considerably deformed even at a low voltage, which is advantageous. Also, the prism 404 and the deformable mirror 409 can be integrally configured into a unit. This is advantageous for assembly.

In FIG. 18, the reflecting surface 409*a* and the deforming electrode 409*k* sandwiching the deforming substrate 409*j* between them are integrally constructed, and thus there is the merit that some manufacturing methods can be chosen. The reflecting surface 409*a* may be designed so that it is also used as the electrode 409*k*. This brings about the merit that the structure is simplified because both are configured into one.

Although not shown in the figure, the solid-state image sensor 408 may be constructed integrally with the substrate of the deformable mirror 409 by a lithography process.

When each of the lenses 901 and 902, the prisms 404 and 405, and the mirror 406 is configured by a plastic mold, an arbitrary curved surface of a desired configuration can be easily obtained and its fabrication is simple. In the above description, the lenses 902 and 901 are arranged separately from the prism 404. However, if the prisms 404 and 405, the mirror 406, and the deformable mirror 409 are designed so that aberration can be eliminated without providing the lenses 902 and 901, the prisms 404 and 405 and the deformable mirror 409 will be configured as one optical block, and the assembly is facilitated. Parts or all of the lenses 902 and 901, the prisms 404 and 405, and the mirror 406 may be made of glass. By doing so, an observation optical system with a higher degree of accuracy is obtained. It is favorable that the profile of the reflecting surface of the deformable mirror is a free-formed surface. This is because correction for aberration can be facilitated, which is advantageous.

Also, although in FIG. 18 the arithmetical unit 414, the temperature sensor 415, the humidity sensor 416, and the range sensor 417 are provided so that the deformable mirror 409 compensates for the changes of the temperature, the humidity, and the object distance, the present invention is not limited to this construction. That is, the arithmetical unit 414, the temperature sensor 415, the humidity sensor 416, and the range sensor 417 may be eliminated so that the deformable mirror 409 compensates for only a change of an observer's diopter.

Figure 19:
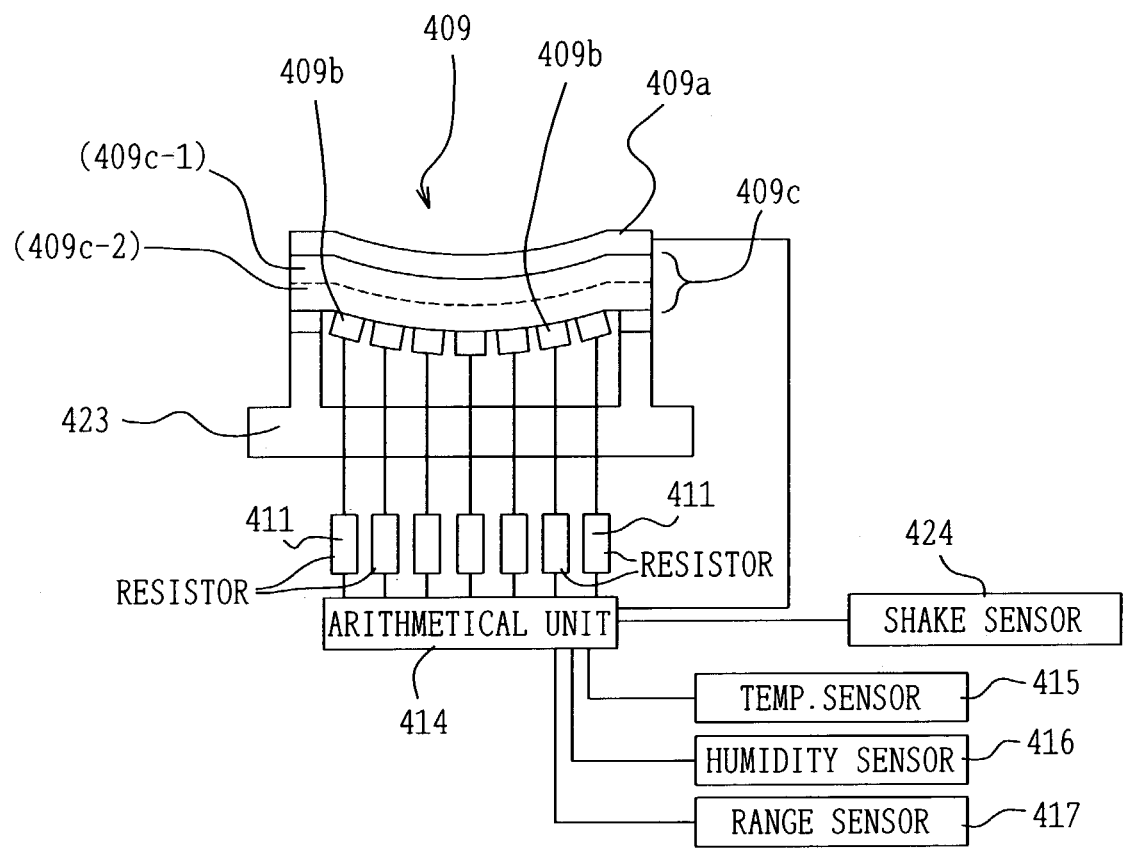
FIG. 19 is a diagram schematically showing another example of the deformable mirror applicable as a variable mirror.

FIG. 19 shows another example of the deformable mirror 409 applicable as the variable mirror used in the optical apparatus of the present invention. In the deformable mirror of this example, a piezoelectric element 409*c* is interposed between the thin film 409*a* and the plurality of electrodes 409*b*, and these are placed on the support 423. A voltage applied to the piezoelectric element 409*c* is changed in accordance with each of the electrodes 409*b*, and thereby the piezoelectric element 409*c* causes expansion and contraction which are partially different so that the shape of the thin film 409*a* can be changed. The configuration of the electrodes 409*b*, as illustrated in FIG. 20, may have a concentric division pattern, or as in FIG. 21, may be a rectangular division pattern. As other patterns, proper configurations can be chosen.

In FIG. 19, reference numeral 424 represents a shake sensor connected to the arithmetical unit 414. The shake sensor 424, for example, detects the shake of a digital camera in photographing and changes the voltages applied to the electrodes 409*b* through the arithmetical unit 414 and variable resistors 411 in order to deform the thin film (reflecting surface) 409*a* to compensate for the blurring of an image caused by the shake. At this time, signals from the temperature sensor 415, the humidity sensor 416, and range sensor 417 are taken into account simultaneously, and focusing and compensation for temperature and humidity are performed. In this case, stress is applied to the thin film 409*a* by the deformation of the piezoelectric element 409*c*, and hence it is good practice to design the thin film 409*a* so that it has a moderate thickness and a proper strength. Also, the piezoelectric element 409*c*, as described later, may have a two-layer structure denoted by 409*c*-1 and 409*c*-2, depending on material used.

Figure 22:
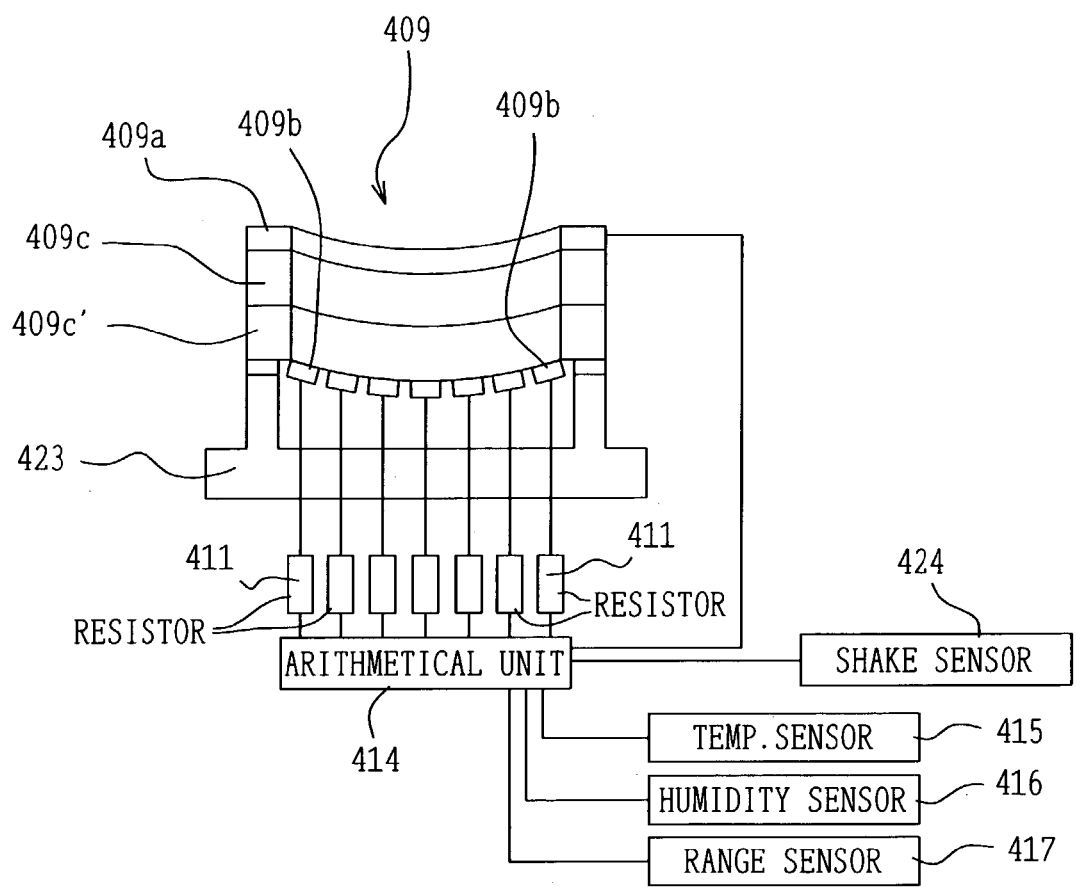
FIG. 22 is a view schematically showing another example of the deformable mirror.

FIG. 22 shows still another example of the deformable mirror 409 applicable as the variable mirror used in the optical apparatus of the present invention. This example has the same construction as the deformable mirror of FIG. 19 with the exception that two piezoelectric elements 409*c* and 409*c*' are interposed between the thin film 409*a* and the plurality of electrodes 409*b* and are made with substances having piezoelectric characteristics which are reversed in direction. Specifically, when the piezoelectric elements 409*c* and 409*c*' are made with ferroelectric crystals, they are arranged so that their crystal axes are reversed in direction with respect to each other. In this case, the piezoelectric elements 409*c* and 409*c*' expand or contract in a reverse direction when voltages are applied, and thus there is the advantage that a force for deforming the thin film (reflecting surface) 409*a* becomes stronger than in the example of FIG. 19, and as a result, the shape of the mirror surface can be considerably changed. Other reference numerals of FIG. 22 are the same as in FIG. 19.

For substances used for the piezoelectric elements 409*c* and 409*c*', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When these piezoelectric elements are used, it is also possible to properly deform the thin film 409*a* in each of the above examples if their thicknesses are made uneven.

As materials of the piezoelectric elements 409*c* and 409*c*', high-polymer piezoelectrics such as polyurethane, silicon rubber, acrylic elastomer, PZT, PLZT, and PVDF (polyvinyldifluoride); vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

Figure 23:
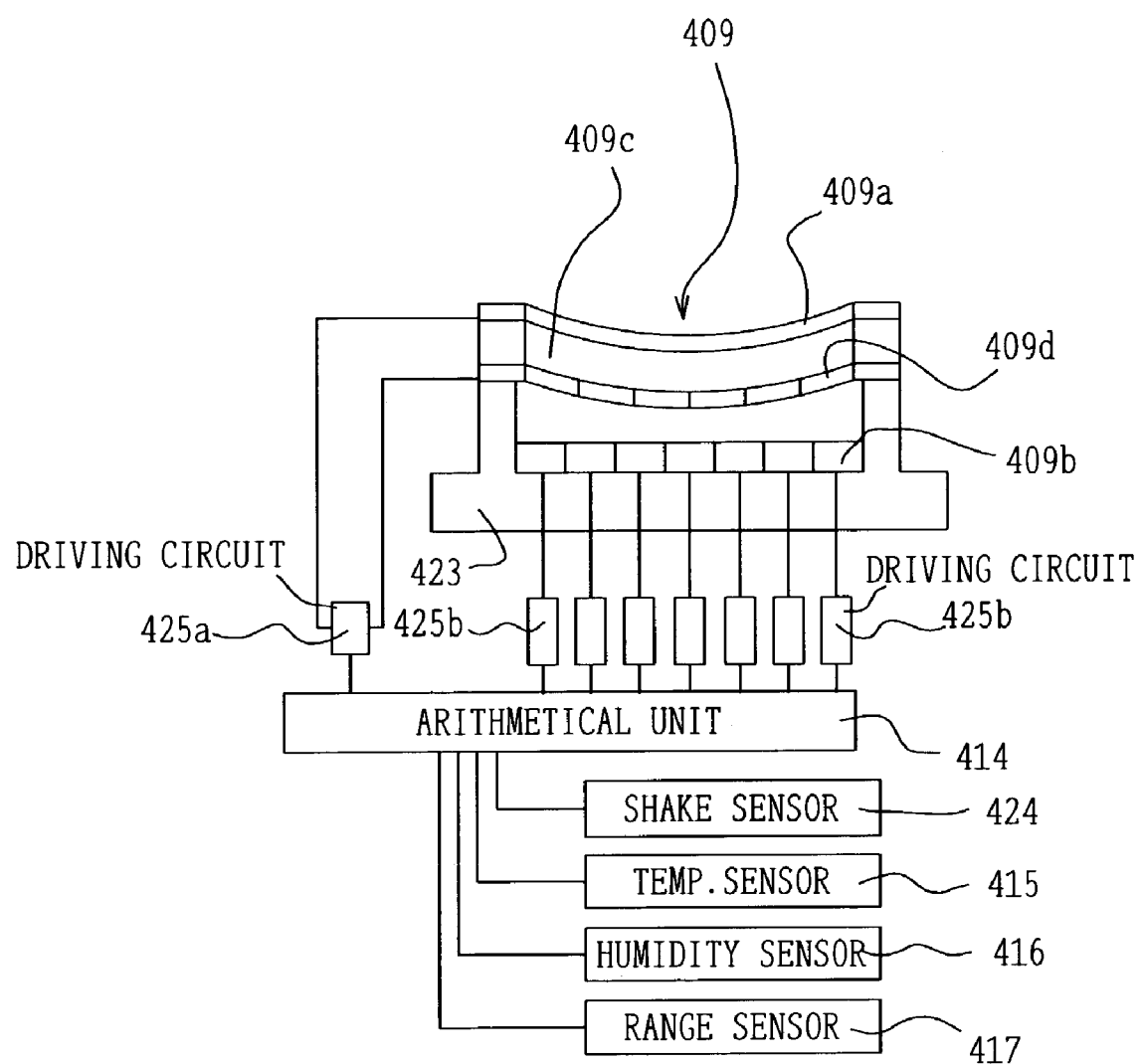
FIG. 23 is a view schematically showing another example of the deformable mirror.

When an electrostrictive substance, for example, acrylic elastomer or silicon rubber, is used for the piezoelectric element 409*c* shown in FIGS. 22 and 23, the piezoelectric element 409*c*, as indicated by a broken line in FIG. 19, may have the two-layer structure in which a substrate 409*c*-1 is cemented to an electrostrictive substance 409*c*-2.

FIG. 23 shows another example of the deformable mirror 409 applicable as the variable mirror used in the optical apparatus of the present invention. The deformable mirror of this example is designed so that the piezoelectric element 409*c* is sandwiched between the thin film 409*a* and a plurality of electrodes 409*d*, and these are placed on the support 423. Voltages are applied to the piezoelectric element 409*c* between the thin film 409*a* and the electrodes 409*d* through a driving circuit 425*a* controlled by the arithmetical unit 414. Furthermore, apart from this, voltages are also applied to the plurality of electrodes 409*b* provided on a bottom surface inside the support 423, through driving circuits 425*b* controlled by the arithmetical unit 414. Therefore, the thin film 409*a* can be doubly deformed by electrostatic forces due to the voltages applied between the thin film 409*a* and the electrodes 409*d* and applied to the electrodes 409*b*. There are advantages that various deformation patterns can be provided and the response is quick, compared with any of the above examples. Other reference numerals of FIG. 23 are the same as in FIG. 19.

By changing the signs of the voltages applied between the thin film 409*a* and the electrodes 409*d*, the thin film 409*a* of the deformable mirror 409 can be deformed into either a convex or concave surface. In this case, a considerable deformation may be performed by a piezoelectric effect, while a slight shape change may be carried out by the electrostatic force. Alternatively, the piezoelectric effect may be chiefly used for the deformation of the convex surface, while the electrostatic force may be used for the deformation of the concave surface. Also, the electrodes 409*d* may be constructed as a single electrode or a plurality of electrodes like the electrodes 409*b*. The condition of electrodes 409*d* constructed as the plurality of electrodes is shown in FIG. 23. In the description, all of the piezoelectric effect, the electrostrictive effect, and electrostriction are generally called the piezoelectric effect. Thus, it is assumed that the electrostrictive substance is included in the piezoelectric substance.

Figure 24:
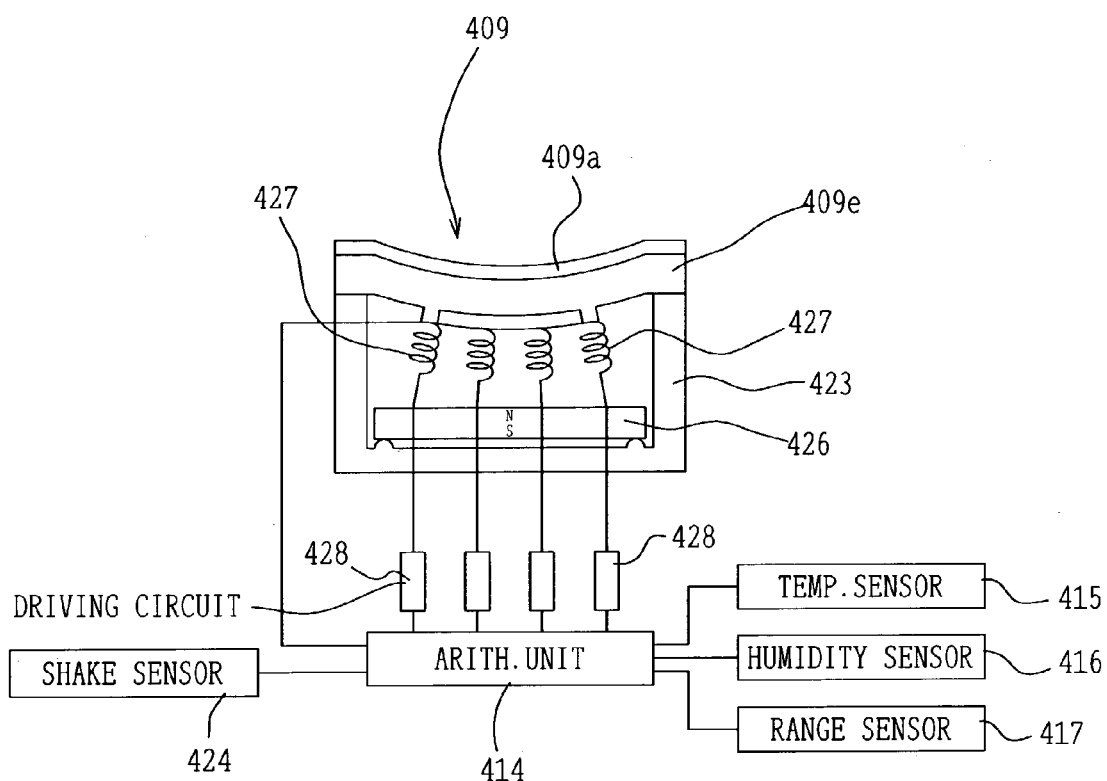
FIG. 24 is a view schematically showing another example of the deformable mirror.

FIG. 24 shows another example of the deformable mirror 409 applicable as the variable mirror used in the optical apparatus of the present invention. The deformable mirror 409 of this example is designed so that the shape of the reflecting surface can be changed by utilizing an electromagnetic force. A permanent magnet 426 is fixed on the bottom surface inside the support 423, and the periphery of a substrate 409*e* made with silicon nitride or polyimide is mounted and fixed on the top surface thereof. The thin film 409*a* with the coating of metal, such as aluminum, is deposited on the surface of the substrate 409*e*, thereby constituting the deformable mirror 409.

Below the substrate 409*e*, a plurality of coils 427 are fixedly mounted and connected to the arithmetical unit 414 through driving circuits 428. Other reference numerals of FIG. 23 are the same as in FIG. 19. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409*e* and the thin film 409*a*.

In this case, a different amount of current can also be caused to flow through each of the coils 427. A single coil 427 may be used. The permanent magnet 426 may be mounted on the lower surface of the substrate 409*e* so that the coils 427 are arranged on the bottom side in the support 423. It is desirable that the coils 427 are constructed as thin film coils by a lithography process. A ferromagnetic iron core may be encased in each of the coils 427.

Figure 25:
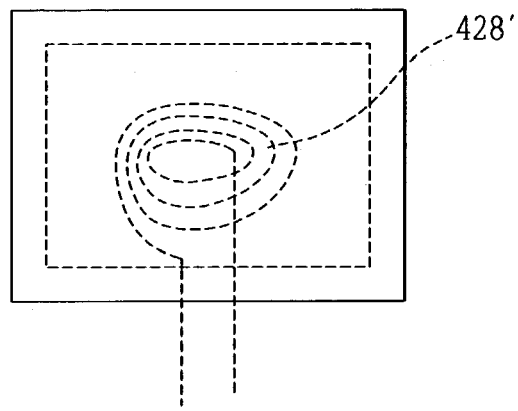
FIG. 25 is an explanatory view showing the winding density of a thin-film coil in the example of FIG. 24.

In the thin film coils, each of the coils 427, as illustrated in FIG. 25, can be designed so that a coil density varies with the place of the lower surface of the substrate 409*e*, like a coil 428', and thereby a desired deformation is brought to the substrate 409*e* and the thin film 409*a*. A single coil 427 may be used, or a ferromagnetic iron core may be encased in each of the coils 427.

Figure 26:
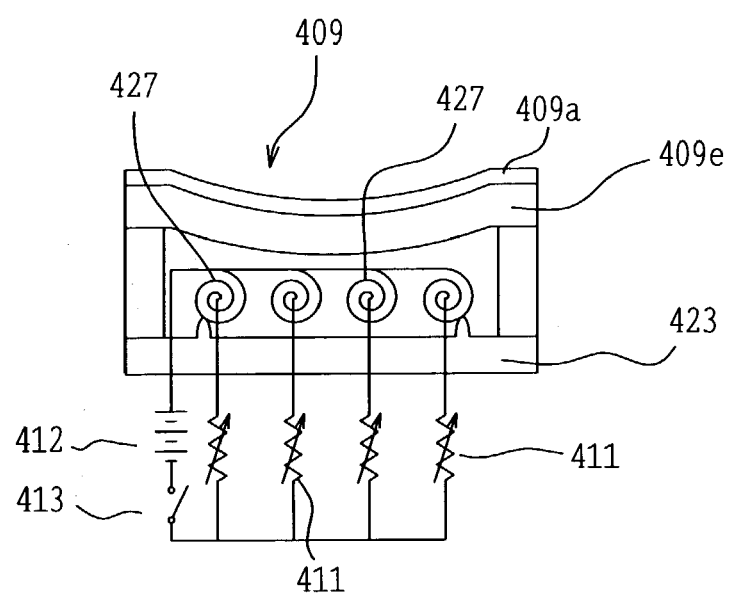
FIG. 26 is a view schematically showing another example of the deformable mirror.

FIG. 26 shows another example of the deformable mirror 409 applicable as the variable mirror used in the optical apparatus of the present invention. In the deformable mirror 409 of this example, the substrate 409*e* is made with a ferromagnetic such as iron, and the thin film 409*a* as a reflecting film is made with aluminum. The periphery of the substrate 409*e* is mounted and fixed on the top surface of the support 423. The coils 427 are fixed on the bottom side in the support 423. In this case, since the thin film coils need not be provided beneath the substrate 409*e*, the structure is simple and the manufacturing cost can be reduced. If the power switch 413 is replaced with a changeover and power on-off switch, the directions of currents flowing through the coils 427 can be changed, and the configurations of the substrate 409*e* and the thin film 409*a* can be changed at will.

Figure 27:
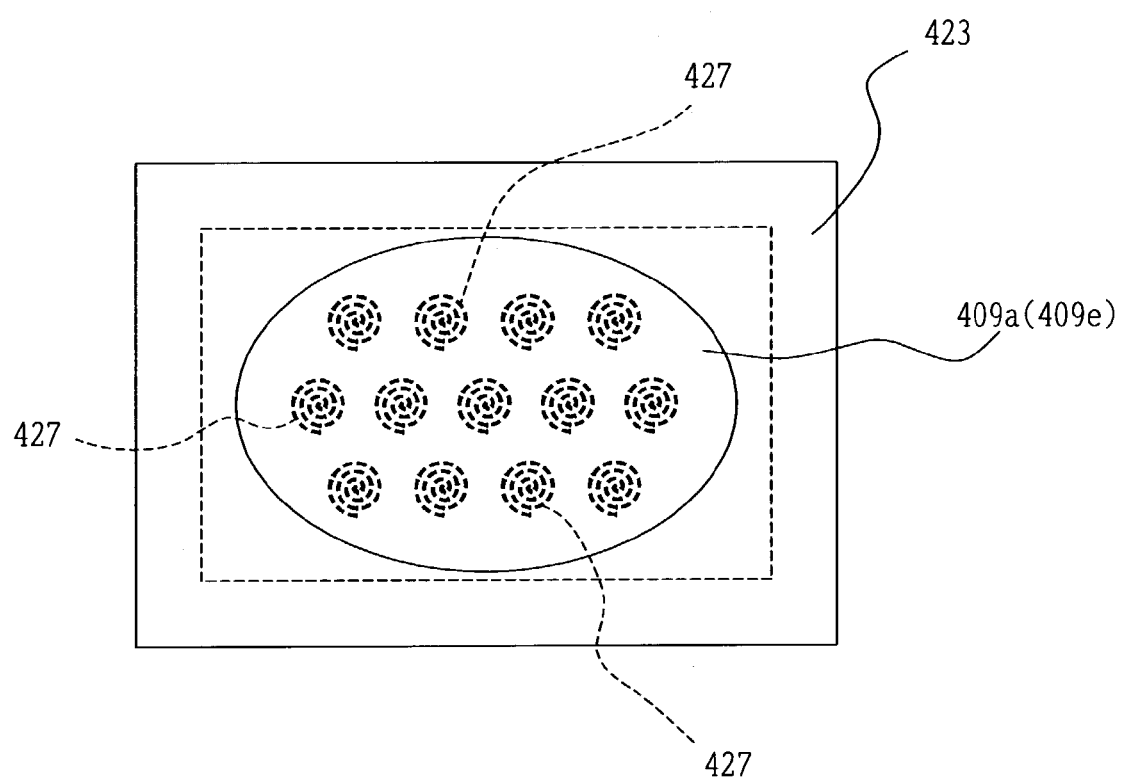
FIG. 27 is an explanatory view showing one example of an array of coils in the example of FIG. 26.
Figure 28:
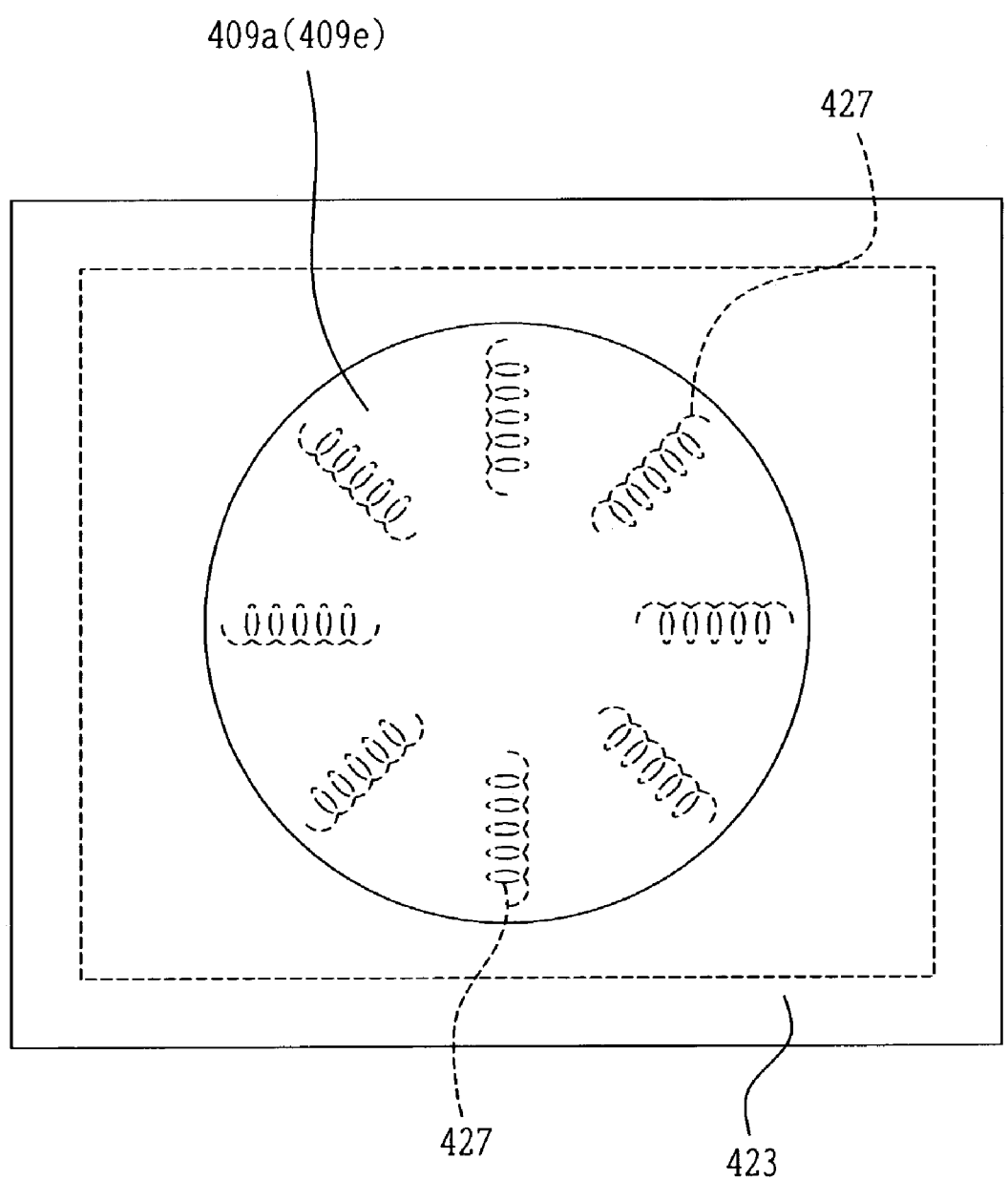
FIG. 28 is an explanatory view showing another example of the array of coils in the example of FIG. 26.
Figure 29:
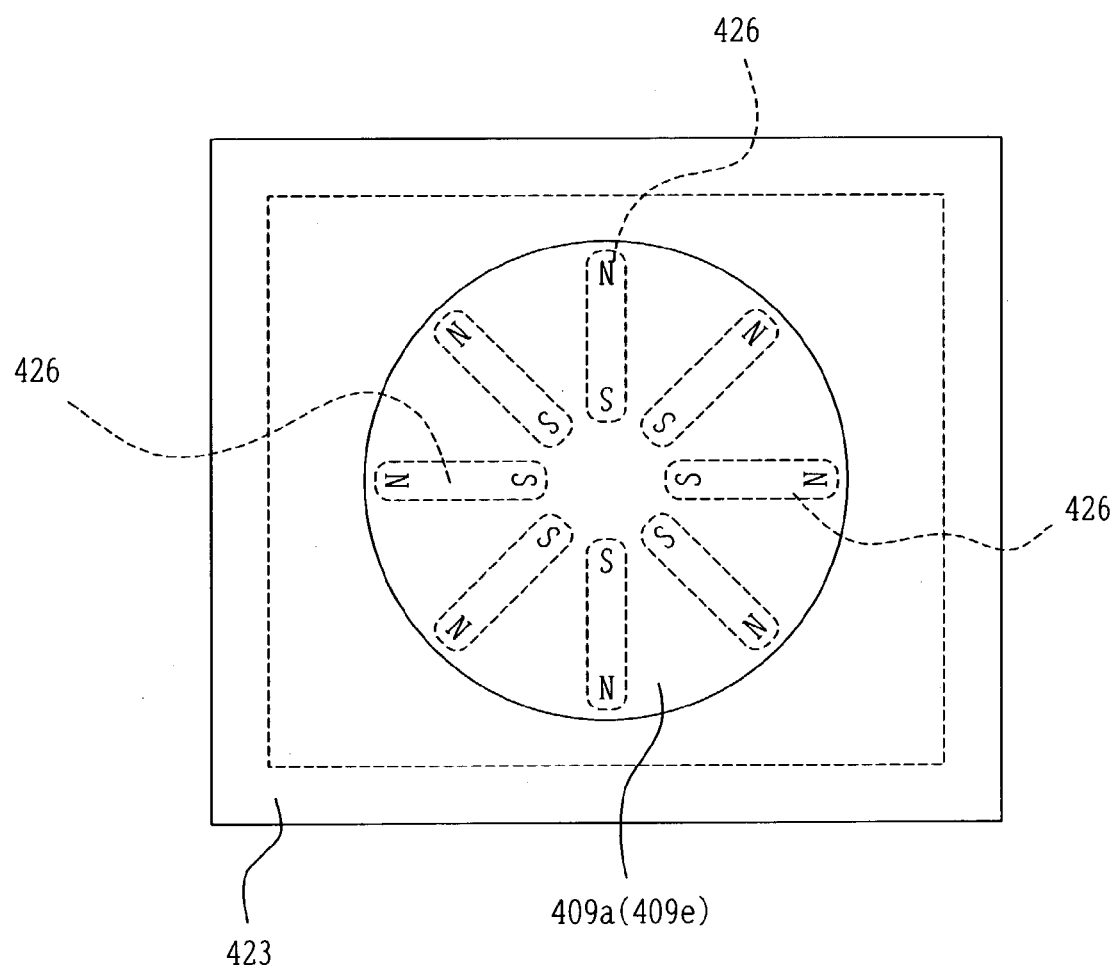
FIG. 29 is an explanatory view showing an array of permanent magnets suitable for the array of coils of FIG. 28 in the example of FIG. 24.

FIG. 27 shows an example of an array of the coils 427 arranged with respect to the thin film 409*a* and the substrate 409*e*. FIG. 28 shows another example of the array of the coils 427. These arrays are also applicable to the example of FIG. 24. FIG. 29 shows an array of the permanent magnets 426 suitable for the case where the coils 427, as shown in FIG. 28, are radially arrayed. Specifically, when the bar-shaped permanent magnets 426, as shown in FIG. 29, are radially arrayed, a delicate deformation can be provided to the substrate 409*e* and the thin film 409*a* in contrast with the example of FIG. 24. As mentioned above, when the electromagnetic force is used to deform the substrate 409*e* and the thin film 409*a* (in the examples of FIGS. 24 and 26), there is the advantage that they can be driven at a lower voltage than in the case where the electrostatic force is used.

Some examples of the deformable mirrors have been described, but as shown in the example of FIG. 23, at least two kinds of forces may be used in order to change the shape of the mirror constructed with a thin film. Specifically, at least two of the electrostatic force, electromagnetic force, piezoelectric effect, magnetrostriction, pressure of a fluid, electric field, magnetic field, temperature change, and electro-magnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

Figure 30:
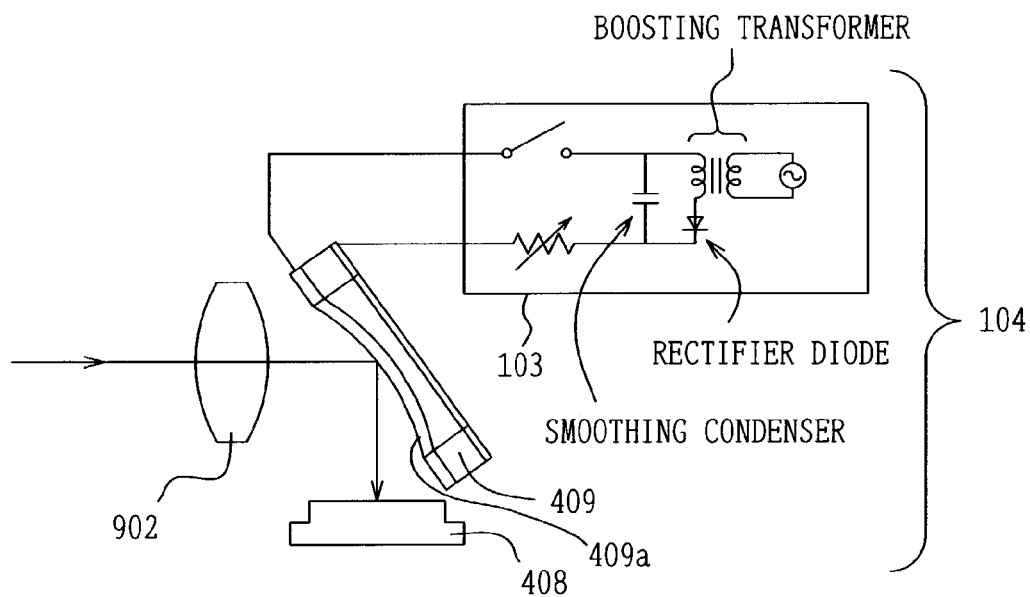
FIG. 30 is a view schematically showing an imaging system which uses the deformable mirror applicable to the optical apparatus of the present invention, for example, an imaging system used in a digital camera of a cellular phone, a capsule endoscope, an electronic endoscope, a digital camera for personal computers, or a digital camera for PDAs.

FIG. 30 shows an imaging system which uses the deformable mirror 409 applicable to the optical apparatus of the present invention and is used, for example, in a digital camera of a cellular phone, a capsule endoscope, an electronic endoscope, a digital camera for personal computers, or a digital camera for PDAs. In the imaging optical system of this example, one imaging unit 104, namely one optical apparatus, is constructed with the deformable mirror 409, the lens 902, the solid-state image sensor 408, and a control system 103. The imaging unit 104 of this example is designed so that light from an object passing through the lens 902 is condensed when reflected by the thin film (reflecting surface) of the deformable mirror 409, and is imaged on the solid-state image sensor 408. The deformable mirror 409 is a kind of variable optical-property element and is also referred to as a variable focal-length mirror.

According to this example, even when the object distance is changed, the reflecting surface 409a of the deformable mirror 409 is deformed and thereby the object can be brought into a focus. The example need not move the lens 902 by using a motor and excels in compact and lightweight design and low power consumption. The imaging unit 104 can be used in any of the examples as the imaging optical system of the present invention. When a plurality of deformable mirrors 409 are used, an optical system, such as a zoom imaging optical system or a variable magnification imaging optical system, can be constructed.

In FIG. 30, an example of a control system is cited which includes the boosting circuit of a transformer using coils in the control system 103. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect. In order to use the deformable mirror 409 for focusing, it is only necessary, for example, to form an object image on the solid-state image sensor 408 and to find a state where the high-frequency component of the object image is maximized while changing the focal-length of the deformable mirror 409. In order to detect the high-frequency component, it is only necessary, for example, to connect a processor including a microcomputer to the solid-state image sensor 408 and to detect the high-frequency component therein.

Figure 31:
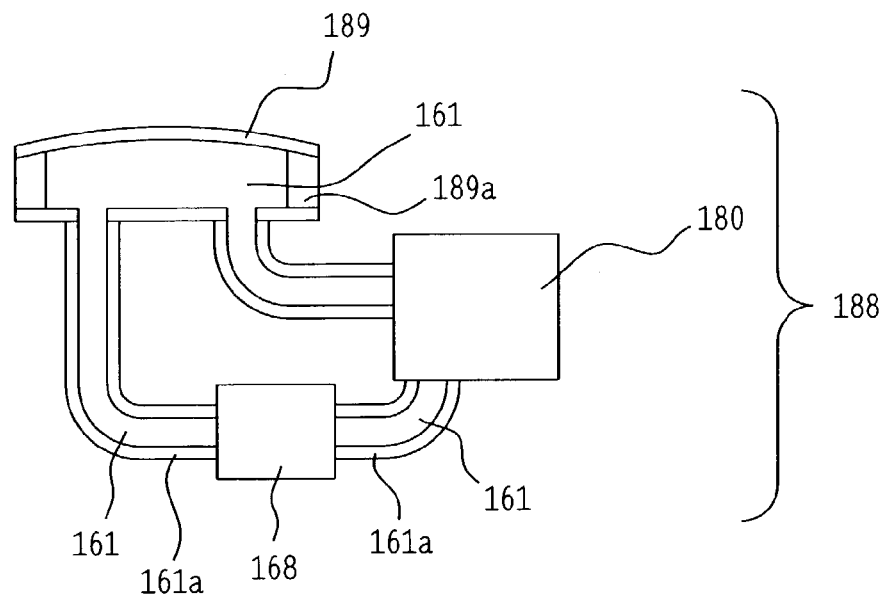
FIG. 31 is a view schematically showing the deformable mirror in which a fluid is taken in and out by a micropump to deform a lens surface.

FIG. 31 shows another example of the deformable mirror. In this figure, a deformable mirror 188 is constructed so that a fluid 161 in a pipe 161a is taken in and out by a micropump 180 to deform a mirror surface which is the upper surface of a reflecting film 189 extended and provided on the upper surface of a support 189a. According to this example, there is the merit that the mirror surface can be considerably deformed. Also, a liquid tank 168 is provided between the support 189a and the micropump 180, which are connected by the pipe, so that the fluid 161 can be supplied by a preset amount inside the support 189a.

The micropump 180 is a small-sized pump, for example, made by a micromachining technique and is constructed so that it is operated with an electric power. As examples of pumps made by the micromachining technique, there are those which use thermal deformations, piezoelectric substances, and electrostatic forces.

Figure 32:
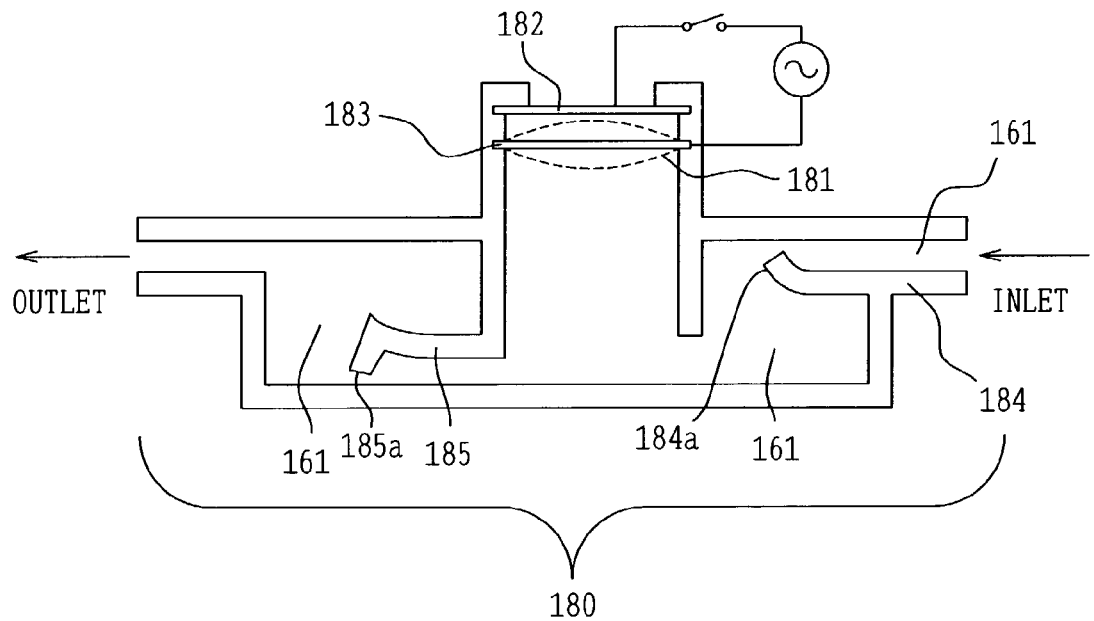
FIG. 32 is a view schematically showing one example of the micropump applicable to the deformable mirror.

FIG. 32 shows the micropump 180. In the micropump 180, a vibrating plate 181 taking the fluid 161 in and out is vibrated by the electrostatic force or the electric force of the piezoelectric effect. In this figure, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, tops 184a and 185a of two valves 184 and 185 are opened and closed to feed the fluid 161 from the right to the left.

In the deformable mirror 188 shown in FIG. 31, the reflecting film 189 is deformed into a concave or convex surface in accordance with the amount of the fluid 161, and thereby the surface of the reflecting film 189 functions as the deformable mirror. The deformable mirror 188 is driven by the fluid 161. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 30, it is desirable that the boosting transformer or the piezoelectric transformer is used to constitute the control system.

If each of the thin film 409a for reflection and the reflecting film 189 is provided with a portion which is fixed to the support 423 or 189a as a portion which is not deformed, it can be used as a reference surface when the profile of the deformable mirror is measured by an interferometer, which is convenient.

Figure 33:
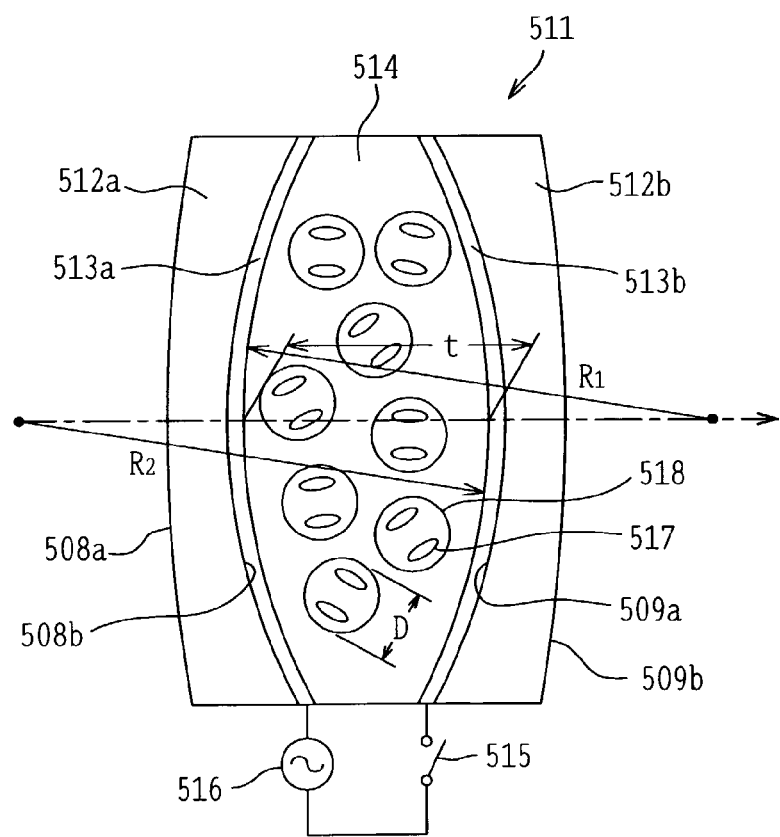
FIG. 33 is a view showing the principle structure of a variable focal-length lens.

FIG. 33 shows the principle structure of the variable focal-length lens applicable to the optical system and the optical apparatus of the present invention. A variable focal-length lens 511 includes a first lens 512a having lens surfaces 508a and 508b as a first surface and a second surface, respectively, a second lens 512b having lens surfaces 509a and 509b as a third surface and a fourth surface, respectively, and a macromolecular dispersed liquid crystal layer 514 sandwiched between these lenses through transparent electrodes 513a and 513b. Incident light is converged through the first and second lenses 512a and 512b. The transparent electrodes 513a and 513b are connected to an alternating-current power supply 516 through a switch 515 so that an alternating-current electric field is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517, and the volume of each cell is equal to the sum of volumes occupied by macromolecules and the liquid crystal molecules 517 which constitute the macromolecular cells 518.

Here, for the size of each of the macromolecular cells 518, for example, in the case of a sphere, when an average diameter is denoted by D and the wave-length of light used is denoted by $\lambda$, the average diameter D is chosen to satisfy the following condition:

$$2 \text{ nm} \leq D \leq \lambda/5 \qquad (1)$$

That is, the size of each of the liquid crystal molecules 517 is at least about 2 nm and thus the lower limit of the average diameter D is set to 2 nm or larger. The upper limit of the diameter D depends on a thickness t of the macromolecular dispersed liquid crystal layer 514 in the direction of the optical axis of the variable focal-length lens 511. However, if the diameter is larger than the wave-length $\lambda$, a difference between the refractive indices of the macromolecules constituting the macromolecular cell 518 and the liquid crystal molecules 517 will cause light to be scattered at the interfaces of the macromolecular cells 518 and will render the liquid crystal layer 514 opaque. Hence, the upper limit of the diameter D should preferably be $\lambda/5$ or less. A high degree of accuracy is not necessarily required, depending on an optical product using the variable focal-length lens. In this case, the diameter D below the value of the wave-length $\lambda$ is satisfactory. Also, the transparency of the macromolecular dispersed liquid crystal layer 514 deteriorates with increasing thickness t.

Figure 34:
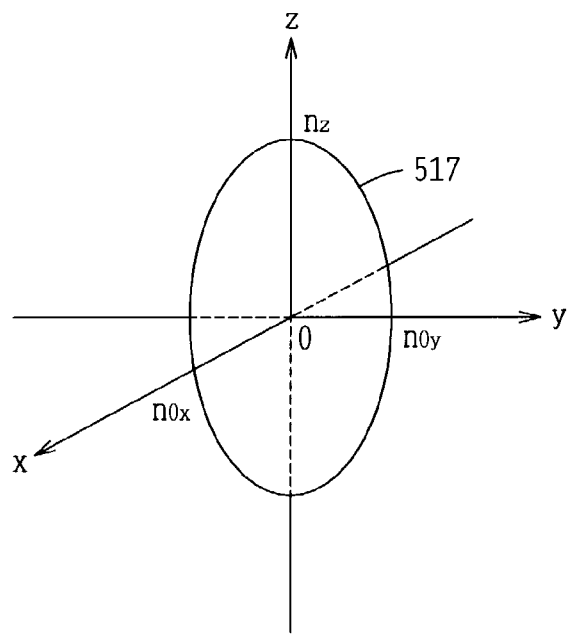
FIG. 34 is a view showing the index ellipsoid of a nematic liquid crystal of uni-axial anisotropy.

In the liquid crystal molecules 517, for example, uniaxial nematic liquid crystal molecules are used. The index ellipsoid of each of the liquid crystal molecules 517 is as shown in FIG. 34. That is, $$n_{ox} = n_{oy} = n_o \qquad (2)$$

where $n_o$ is the refractive index of an ordinary ray, and $n_{ox}$ and $n_{oy}$ are refractive indices in directions perpendicular to each other in a plane including ordinary rays.

Figure 35:
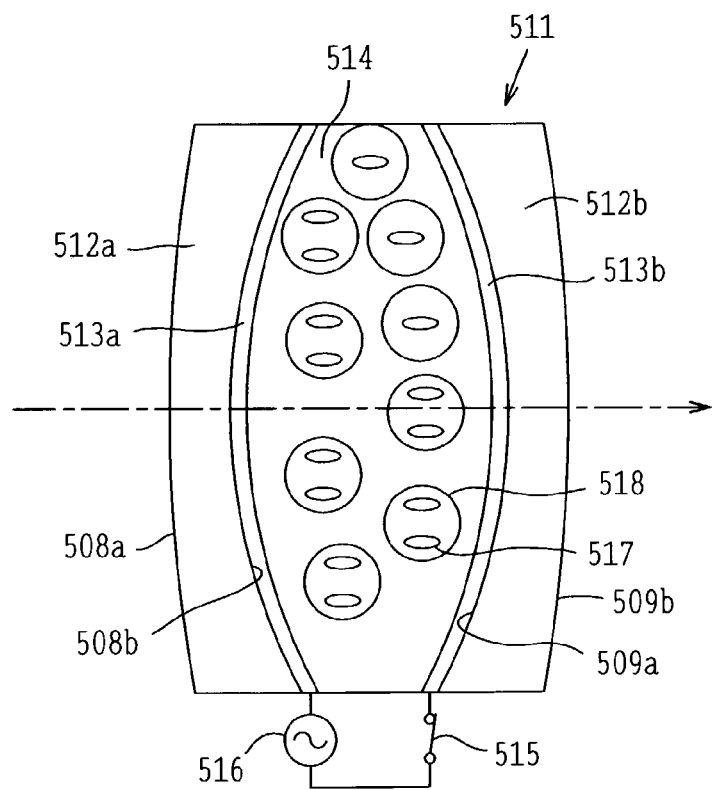
FIG. 35 is a view showing a state where an electric field is applied to a macro-molecular dispersed liquid crystal layer in FIG. 33.

Here, in the case where the switch 515, as shown in FIG. 33, is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 35, is turned on and the alternating-current electric field is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 36:
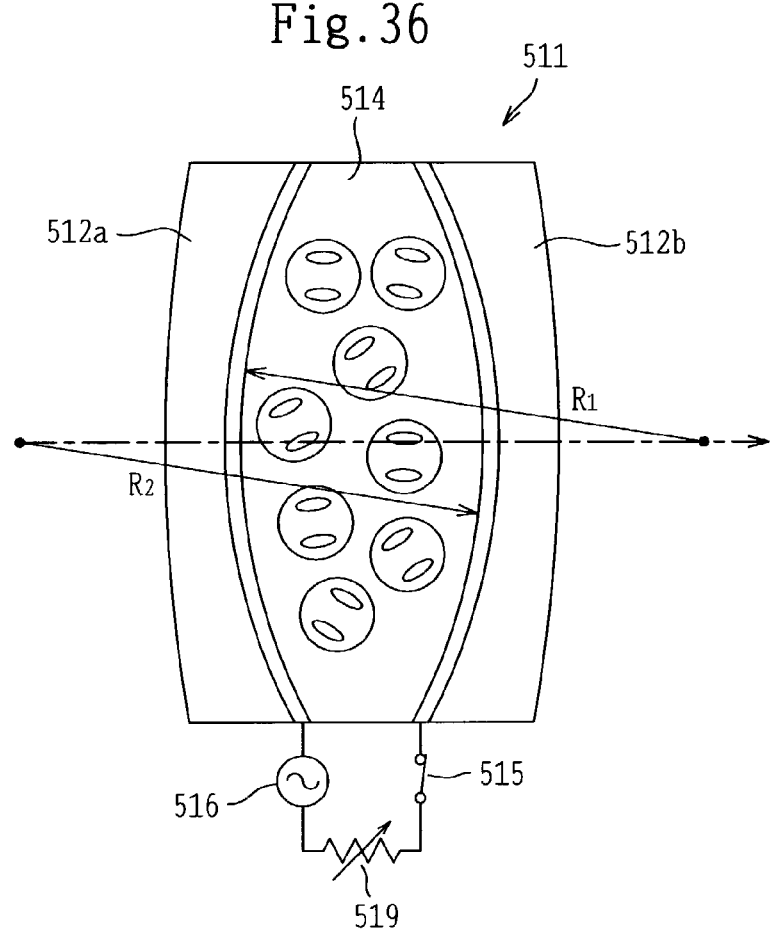
FIG. 36 is a view showing an example where a voltage applied to the macro-molecular dispersed liquid crystal layer in FIG. 33 can be changed.

The voltage applied to the macromolecular dispersed liquid crystal layer 514, for example, as shown in FIG. 36, can be changed stepwise or continuously by a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 33, that is, in the case where the electric field is not applied to the macromolecular dispersed liquid crystal layer 514, when the refractive index in the direction of the major axis of the index ellipsoid, as shown in FIG. 34, is denoted by $n_z$, an average refractive index $n_{LC}'$ of the liquid crystal molecules 517 is roughly given by $$(n_{ox}+n_{oy}+n_x)/3 \equiv n_{LC}' \quad (3)$$

Also, when the refractive index $n_z$ is expressed as a refractive index $n_e$ of an extraordinary ray, an average refractive index $n_{LC}$ of the liquid crystal molecules 517 where Equation (2) is established is given by $$(2n_o+n_e)/3 \equiv n_{LC} \quad (4)$$

In this case, when the refractive index of each of the macromolecules constituting the macromolecular cells 518 is represented by $n_p$ and the ratio of volume between the liquid crystal layer 514 and the liquid crystal molecules 517 is represented by ff, a refractive index $n_A$ of the liquid crystal layer 514 is given from the Maxwell-Garnet's law as $$n_A = ff \cdot n_{LC} + (1-ff)n_p \quad (5)$$

Thus, as shown in FIG. 33 or 36, when the radii of curvature of the inner surfaces of the lenses 512a and 512b, that is, the surfaces on the side of the liquid crystal layer 514, are represented by $R_1$ and $R_2$, a focal-length $f_1$ of the lens constructed with the liquid crystal layer 514 is given by $$1/f_1 = (n_A-1)(1/R_1-1/R_2) \quad (6)$$

Also, when the center of curvature is located on the image side, it is assumed that each of the radii of curvature $R_1$ and $R_2$ is positive. Refraction caused by the outer surface of each of the lenses 512a and 512b is omitted. That is, the focal-length of the lens constructed with only the liquid crystal layer 514 is given by Equation (6).

When the average refractive index of ordinary rays is expressed as $$(n_{ox}+n_{oy})/2 \equiv n_o' \quad (7)$$

a refractive index $n_B$ of the liquid crystal layer 514 in the case of FIG. 35, namely, in the case where the electric field is applied to the liquid crystal layer 514, is given by $$n_B = ff \cdot n_o' + (1-ff)n_p \quad (8)$$

and thus a focal-length $f_2$ of the lens constructed with only the liquid crystal layer 514 in this case is given by $$1/f_2 = (n_B-1)(1/R_1-1/R_2) \quad (9)$$

Also, the focal-length where a lower voltage than in FIG. 35 is applied to the liquid crystal layer 514 takes a value between the focal-length $f_1$ given by Equation (6) and the focal-length $f_2$ by Equation (9).

From Equations (6) and (9), a change rate of the focal-length of the lens constructed with the liquid crystal layer 514 is given by $$|(f_2-f_1)/f_2| = |(n_B-n_A)/(n_B-1)| \quad (10)$$

Thus, in order to increase the change rate, it is only necessary to increase the value of $|n_B-n_A|$. Here, $$n_B-n_A = ff(n_o'-n_{LC}') \quad (11)$$

and hence if the value of $|n_o'-n_{LC}'|$ is increased, the change rate can be raised. Practically, since the refractive index $n_B$ of the liquid crystal layer 514 is about 1.3–2, the value of $|n_o'-n_{LC}'|$ is chosen so as to satisfy the following condition:

$$0.01 \leq |n_o'-n_{LC}'| \leq 10 \quad (12)$$

In this way, when ff=0.5, the focal-length of the lens constructed with the liquid crystal layer 514 can be changed by at least 0.5%, and thus an effective variable focal-length lens can be obtained. Also, the value of $|n_o'-n_{LC}'|$ cannot exceed 10 because of restrictions on liquid crystal substances.

Subsequently, a description will be given of grounds for the upper limit of Condition (1). The variation of a transmittance τ where the size of each cell of a macromolecular dispersed liquid crystal is changed is described in "Transmission variation using scattering/transparent switching films" on pages 197–214 of "Solar Energy Materials and Solar Cells", Wilson and Eck, Vol. 31, Eleesvier Science Publishers B. v., 1993. In FIG. 7 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance τ becomes at least 70–80% and the liquid crystal can be actually used as a lens, if the liquid crystal satisfies the following condition:

$$D \cdot t \leq \lambda \cdot 15 \text{ μm} \quad (13)$$

Hence, for example, in the case of t=75 μm, if D≤λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, if the values of the refractive indices $n_o'$ and $n_p$ are different from each other, the transmittance of the liquid crystal layer 514 will be degraded. In FIGS. 33 and 35, the transmittance of the liquid crystal layer 514 is improved on an average when the liquid crystal layer 514 satisfies the following equation:

$$n_p = (n_o' + n_{LC}')/2 \quad (14)$$

The variable focal-length lens 511 having the lens constructed with the macromolecular dispersed liquid crystal layer 514 between the first lens 512a and the second lens 412b is used as a lens, and thus in both FIGS. 33 and 35, it is desirable that the transmittances are almost the same and high. For this, although there are limits to the substances of the macromolecules and the liquid crystal molecules 517 constituting the macromolecular cells 518, it is only necessary, in practical use, to satisfy the following condition:

$$n_o' \leq n_p \leq n_{LC}' \quad (15)$$

When Equation (14) is satisfied, Condition (13) is moderated and it is only necessary to satisfy the following condition:

$$D \cdot t \leq \lambda \cdot 60 \ \mu m \quad (16)$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \ \mu m \cdot (1.585 - 1.45)^2 / (n_u - n_p)^2 \quad (17)$$

where $(n_u - n_p)^2$ is a value when one of $(n_{LC}' - n_p)^2$ and $(n_o' - n_p)^2$ is larger than the other.

In order to largely change the focal-length of the lens constructed with the macromolecular dispersed liquid crystal layer 514, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 \leq \text{ff} \leq 0.999 \quad (18)$$

On the other hand, the transmittance τ improves as the ratio ff becomes low, and hence Condition (17) may be moderated, preferably, as follows:

$$4 \times 10^{-6} \ [\mu m]^2 \leq D \cdot t \leq \lambda \cdot 45 \ \mu m \cdot (1.585 - 1.45)^2 / (n_u - n_p)^2 \quad (19)$$

Also, the lower limit of the thickness t, as is obvious from FIG. 33, corresponds to the diameter D, which is at least 2 nm as described above, and therefore the lower limit of D·t becomes $(2 \times 10^{-3} \ \mu m)^2$, namely $4 \times 10^{-6} \ [\mu m]^2$.

An approximation where the optical property of substance is represented by the refractive index is established when the diameter D is 5–10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's equation of reflection. As such, in practical use, the diameter D must be chosen so as to satisfy the following condition:

$$7 \ nm \leq D \leq 500 \ \lambda \quad (20)$$

Figure 37:
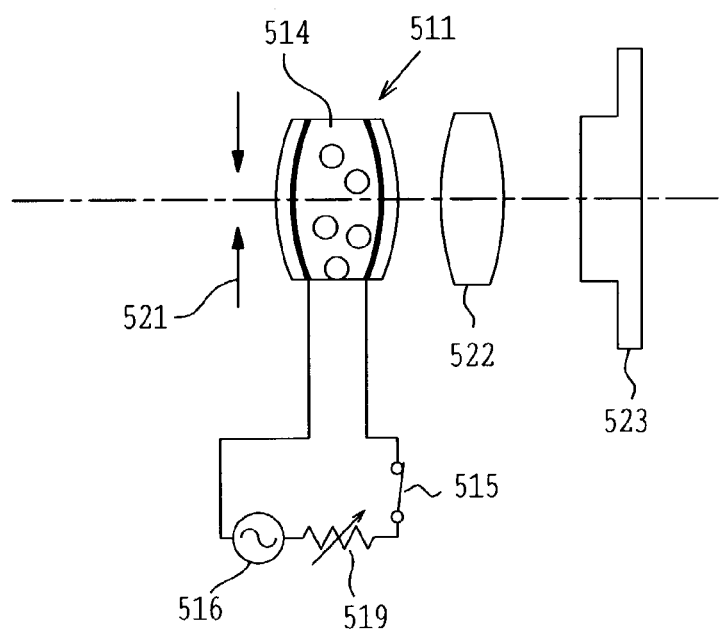
FIG. 37 is a view showing an example of an imaging optical system for digital cameras which uses the variable focal-length lens.

FIG. 37 shows an imaging optical system for digital cameras using the variable focal-length lens 511 of FIG. 36. In this imaging optical system, an image of an object (not shown) is formed on a solid-state image sensor 523, such as a CCD, through a stop 521, the variable focal-length lens 511, and a lens 522. Also, in FIG. 37, the liquid crystal molecules are not shown.

According to such an imaging optical system, the alternating voltage applied to the macromolecular dispersed liquid crystal layer 514 of the variable focal-length lens 511 is controlled by the variable resistor 519 to change the focal-length of the variable focal-length lens 511. Whereby, without moving the variable focal-length lens 511 and the lens 522 along the optical axis, it becomes possible to perform continuous focusing with respect to the object distance, for example, from the infinity to 600 mm.

Figure 38:
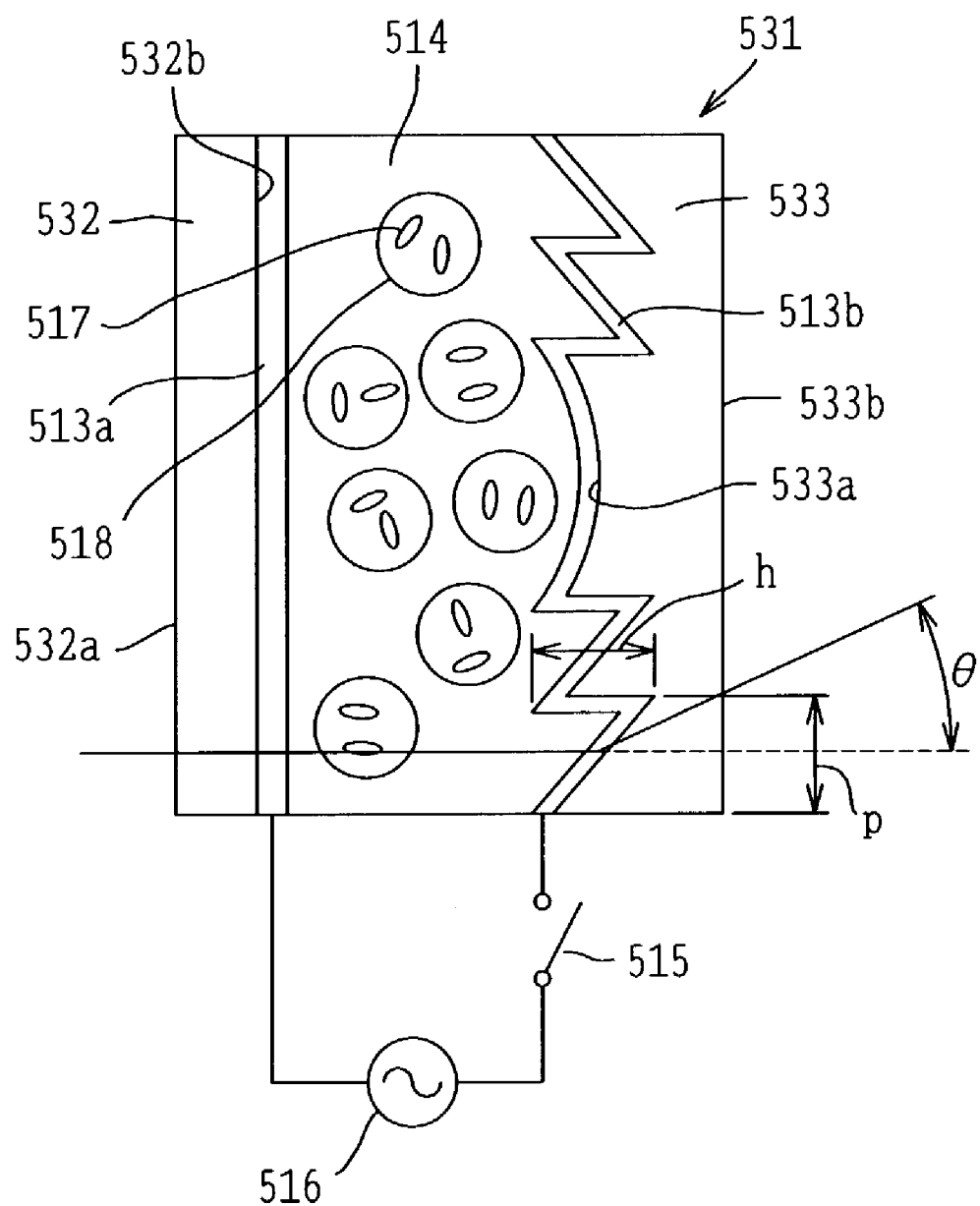
FIG. 38 is a view showing an example of a variable focal-length diffraction optical element.

FIG. 38 shows one example of a variable focal-length diffraction optical element as the variable optical-property element. This variable focal-length diffraction optical element 531 includes a first transparent substrate 532 having a first surface 532a and a second surface 532b which are parallel with each other and a second transparent substrate 533 having a third surface 533a which is constructed with an annular diffraction grating of saw-like cross section having the depth of a groove corresponding to the wavelength of light and a fourth surface 533b which is flat. Incident light emerges through the first and second transparent substrates 532 and 533. Between the first and second transparent substrates 532 and 533, as in FIG. 33, the macromolecular dispersed liquid crystal layer 514 is sandwiched through the transparent electrodes 513a and 513b so that the transparent electrodes 513a and 513b are connected to the alternating-current power supply 516 through the switch 515 and the alternating-current voltage is applied to the macromolecular dispersed liquid crystal layer 514.

In such a structure, when the grating pitch of the third surface 533a is represented by p and an integer is represented by m, a ray of light incident on the variable focal-length diffraction optical element 531 is deflected by an angle θ satisfying the following equation:

$$p \sin \theta = m \lambda \quad (21)$$

and emerges therefrom. When the depth of the groove is denoted by h, the refractive index of the transparent substrate 533 is denoted by $n_{33}$, and an integer is denoted by k, a diffraction efficiency becomes 100% at the wavelength λ and the production of flare can be prevented by satisfying the following equations:

$$h(n_A - n_{33}) = m\lambda \quad (22)$$

$$h(n_B - n_{33}) = k\lambda \quad (23)$$

where $n_A$ is a refractive index in a state where the alternating-current voltage is not applied to the liquid crystal layer 514 and $n_B$ is a refractive index in a state where the alternating-current voltage is applied to the liquid crystal layer 514.

Here, the difference in both sides between Equations (22) and (23) is given by $$h(n_A - n_B) = (m - k)\lambda \quad (24)$$

Therefore, when it is assumed that λ=500 nm, $n_A$=1.55, and $n_B$=1.5, 0.05 h=(m−k)·500 nm and when m=1 and k=0, h=10000 nm=10 μm In this case, the refractive index $n_{33}$ of the transparent substrate 533 is obtained as 1.5 from Equation (22). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used for focus adjustment in such a way that it is placed at a portion where the light beam of a lens system is not parallel, or can be used to change the focal-length of the entire lens system.

In this example, it is only necessary that Equations (22)–(24) are set in practical use to satisfy the following conditions:

$$0.7\ m\ \lambda \leq h(n_A - n_{33}) \leq 1.4\ m\ \lambda \quad (25)$$

$$0.7\ k\ \lambda \leq h(n_B - n_{33}) \leq 1.4\ k\ \lambda \quad (26)$$

$$0.7(m-k)\lambda \leq h(n_A - n_B) \leq 1.4(m-k)\lambda \quad (27)$$

Figure 39:
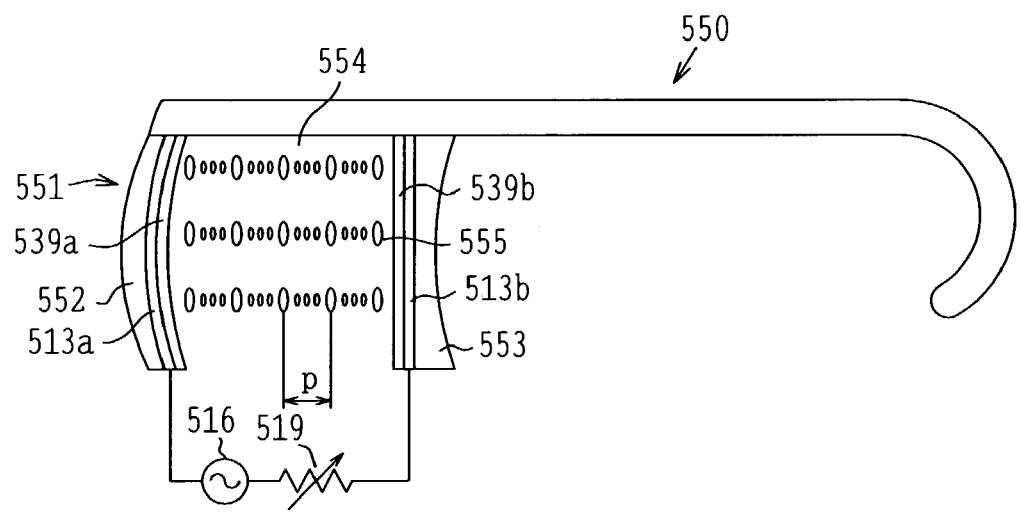
FIG. 39 is a view showing variable focal-length spectacles, each having a variable focal-length lens which uses a twisted nematic liquid crystal.
Figure 40:
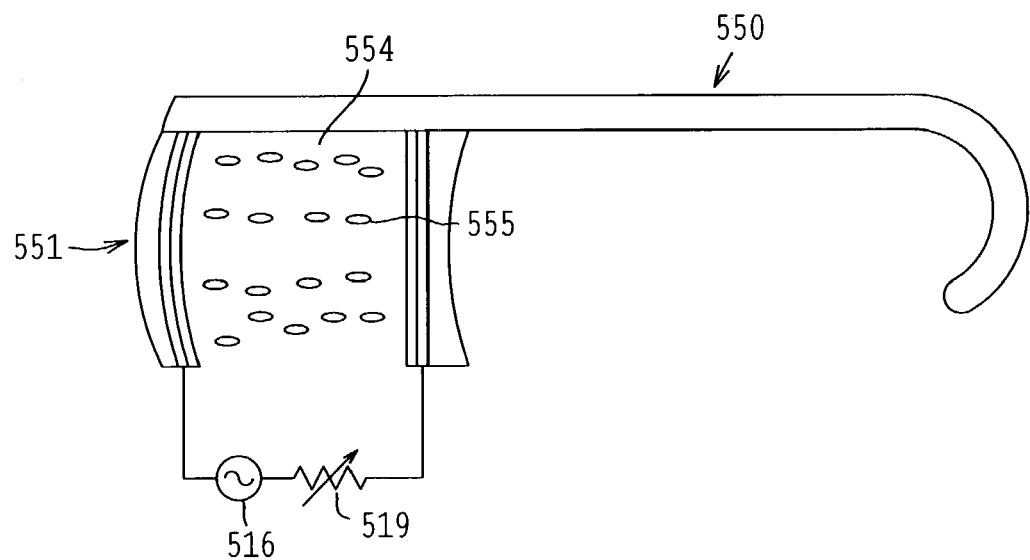
FIG. 40 is a view showing the orientation of liquid crystal molecules where a voltage applied to a twisted nematic liquid crystal layer of FIG. 39 is increased.

A variable focal-length lens using a twisted nematic liquid crystal also falls into the category of the present invention. FIGS. 39 and 40 show variable focal-length spectacles 550 in this case and cross sections thereof. A variable focal-length lens 551 has lenses 552 and 553, orientation films 539a and 539b provided through the transparent electrodes 513a and 513b, respectively, inside these lenses, and a twisted nematic liquid crystal layer 554 sandwiched between the orientation films. The transparent electrodes 513a and 513b are connected to the alternating-current power supply 516 through the variable resistor 519 so that the alternating-current voltage is applied to the twisted nematic liquid crystal layer 554.

In this structure, when the voltage applied to the twisted nematic liquid crystal layer 554 is increased, liquid crystal molecules 555, as illustrated in FIG. 40, exhibit a homeotropic orientation, in which the refractive index of the liquid crystal layer 554 is lower and the focal-length is longer than in a twisted nematic state of FIG. 39 in which the applied voltage is low.

A spiral pitch P of the liquid crystal molecules 555 in the twisted nematic state of FIG. 39 must be made nearly equal to, or much smaller than, the wavelength λ of light, and thus is set to satisfy the following condition:

$$2\ \text{nm} \leq P \leq 2\lambda/3 \quad (28)$$

Also, the lower limit of this condition depends on the sizes of the liquid crystal molecules 555, while the upper limit is a value necessary for the behavior of the liquid crystal layer 554 as an isotropic medium in a state of FIG. 39 when incident light is natural light. If the upper limit of the condition is overstepped, the variable focal-length lens 551 is changed to a lens in which the focal-length varies with the direction of deflection. Hence, a double image is formed and only a blurred image is obtained.

Figure 41A:
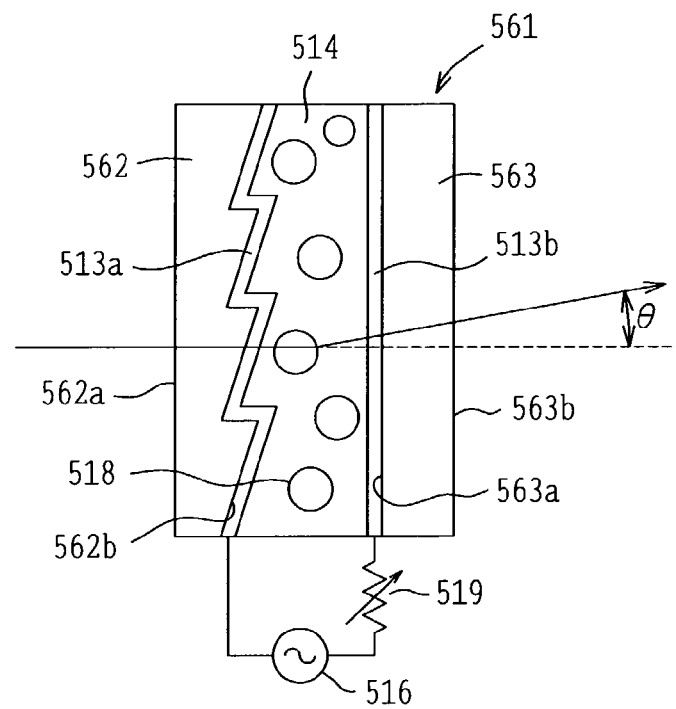
FIGS. 41A and 41B are views showing two examples of variable deflection-angle prisms.
Figure 41B:
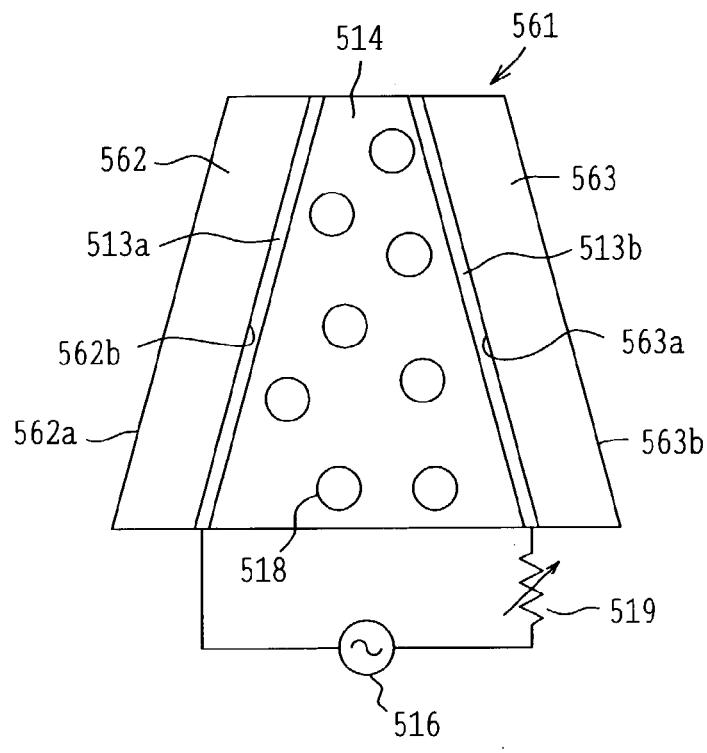

FIG. 41A shows a variable deflection-angle prism as the variable optical-property element. A variable deflection-angle prism 561 includes a first transparent substrate 562 on the entrance side, having a first surface 562a and a second surface 562b; and a second transparent substrate 563 of a plane-parallel plate on the exit side, having a third surface 563a and a fourth surface 563b. The inner surface (the second surface) 562b of the transparent substrate 562 on the entrance side is configured into a Fresnel form, and the macromolecular dispersed liquid crystal layer 514, as in FIG. 33, is sandwiched between the transparent substrate 562 and the transparent substrate 563 on the exit side through the transparent electrodes 513a and 513b. The transparent electrodes 513a and 513b are connected to the alternating-current power supply 516 through the variable resistor 519. Whereby, the alternating-current voltage is applied to the liquid crystal layer 514 so that a deflection angle θ of light transmitted through the variable deflection-angle prism 561 is controlled. In this way, transmission light is controlled with respect to the direction of deflection. Also, in FIG. 41A, the inner surface 562b of the transparent substrate 562 is configured into the Fresnel form, but as shown in FIG. 41B, the inner surfaces of the transparent substrates 562 and 563 may be configured like an ordinary prism whose surfaces are relatively inclined, or may be configured like the diffraction grating shown in FIG. 38. In the case of the latter, Equations (21)–(24) and Conditions (25)–(27) apply equally.

Figure 42:
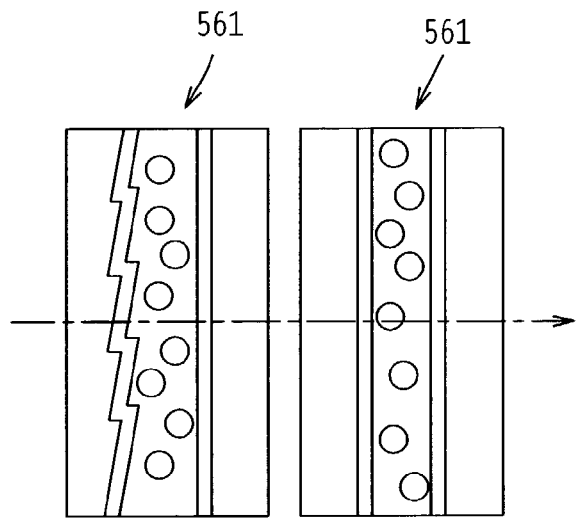
FIG. 42 is a view for explaining the applications of the variable deflection-angle prisms shown in FIGS. 41A and 41B.

The variable deflection-angle prism 561 constructed mentioned above can be effectively used for shake prevention for TV cameras, digital cameras, film cameras, binoculars, etc. In this case, it is desirable that the direction of refraction (deflection) of the variable deflection-angle prism 561 is vertical. In order to further improve its performance, it is desirable that two variable deflection-angle prisms 561, one of which is shown in FIG. 41A, are used and arranged so that the direction of deflection of each of the prisms 561 is varied and as shown in FIG. 42, the refraction angles are changed in vertical and lateral directions. Also, in FIGS. 41A, 41B, and 42, the liquid crystal molecules are omitted.

Figure 43:
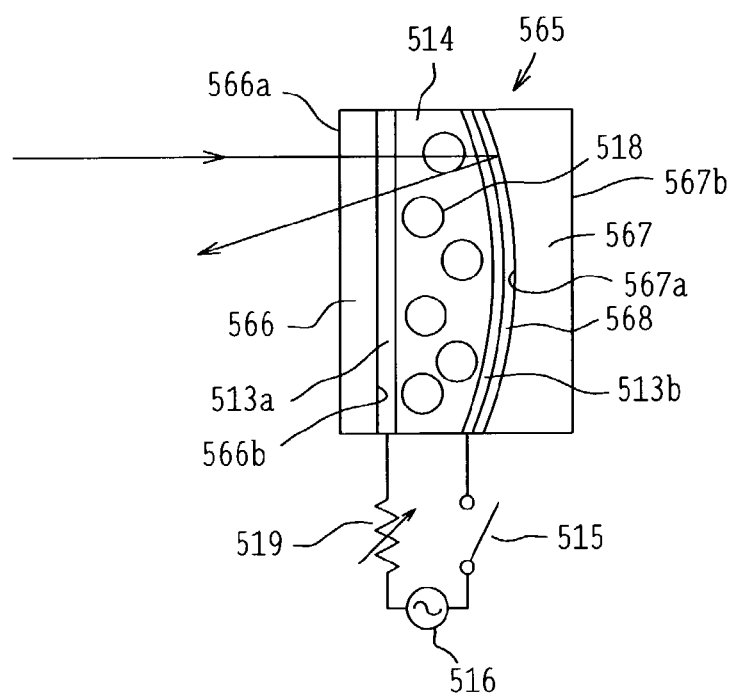
FIG. 43 is a view schematically showing an example of a variable focal-length mirror as the variable focal-length lens.

FIG. 43 shows an example where a variable focal-length lens is used as the variable focal-length mirror in the optical system. A variable focal-length mirror 565 includes a first transparent substrate 566 having a first surface 566a and a second surface 566b, and a second transparent substrate 567 having a third surface 567a and a fourth surface 567b. The first transparent substrate 566 is configured into a flat plate or lens shape to provide the transparent electrode 513a on the inner surface (the second surface) 566b. The second transparent substrate 567 is such that the inner surface (the third surface) 567a is configured as a concave surface, on which a reflecting film 568 is deposited, and the transparent electrode 513b is provided on the reflecting film 568. Between the transparent electrodes 513a and 513b, as in FIG. 33, the macromolecular dispersed liquid crystal layer 514 is sandwiched so that the transparent electrodes 513a and 513b are connected to the alternating-current power supply 516 through the switch 515 and the variable resistor 519, and the alternating-current voltage is applied to the macromolecular dispersed liquid crystal layer 514. Also, in FIG. 43, the liquid crystal molecules are omitted.

According to the above structure, since a ray of light incident from the side of the transparent substrate 566 is passed again through the liquid crystal layer 514 by the reflecting film (reflecting surface) 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, the conditions mentioned above can be used. Moreover, the inner surface of the transparent substrate 566 or 567, as shown in FIG. 38, can also be configured into a diffraction grating shape to reduce the thickness of the liquid crystal layer 514. By doing so, the amount of scattered light can be decreased.

In the above description, in order to prevent the deterioration of the liquid crystal, the alternating-current power supply 516 is used as a voltage source to apply the alternating-current voltage to the liquid crystal layer. However, a direct-current power supply is used and thereby a direct-current voltage can also be applied to the liquid crystal layer. Techniques of shifting the orientation of the liquid crystal molecules, in addition to changing the voltage, can be achieved by changing the frequency of the electric field applied to the liquid crystal layer, the strength and frequency of the magnetic field applied to the liquid crystal layer, or the temperature of the liquid crystal layer. In the above description, some of macromolecular dispersed liquid crystal layers are close to solids, rather than liquids. In this case, therefore, one of the lenses 512a and 512b shown in FIG. 33, the transparent substrates 532 and 533 in FIG. 38, one of the lenses 552 and 553 in FIG. 39, the transparent substrate 563 in FIG. 41A, one of the transparent substrates 562 and 563 in FIG. 41B, or one of the transparent substrates 566 and 567 in FIG. 43, may be eliminated.

The merits of the optical element of the type that the focal-length of the optical element is changed by altering the refracting index of a medium constructed with the macromolecular dispersed liquid crystal layer, such as that described in FIGS. 33-43, are that a mechanical design is easy because the shape is not changed, a mechanical structure becomes simple, and so on.

Figure 44:
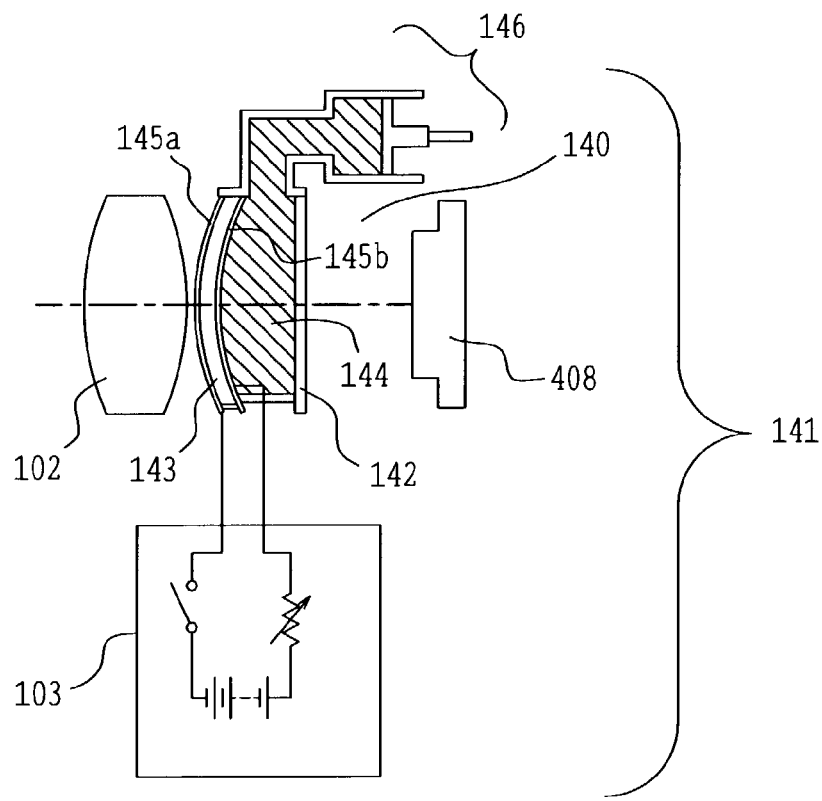
FIG. 44 is a view schematically showing the variable focal-length lens used in an imaging unit used as the optical apparatus of the present invention or the optical system of the imaging unit.

FIG. 44 shows an imaging unit 141 using a variable focal-length lens 140 in the imaging optical system of the optical apparatus of the present invention. The imaging unit 141 can be used as the imaging optical system of the present invention.

In this example, a lens 102 and the variable focal-length lens 140 constitute an imaging lens system. This imaging lens system and the solid-state image sensor 408 constitute the imaging unit 141. The variable focal-length lens 140 is constructed with a planar transparent member 142; a soft transparent substance 143, such as piezoelectric synthetic resin, sandwiched between a pair of transparent electrodes 145a and 145b; and a light-transmitting fluid or jelly-like substance 144 sandwiched between a transparent member 142 and the transparent electrode 145b.

As the fluid or jelly-like substance 144, silicon oil, elastic rubber, jelly, or water can be used. When voltages are applied through a circuit 103 to the transparent electrodes 145a and 145b between which the transparent substance 143 is sandwiched, the transparent substance 143 is deformed by the piezoelectric effect of the transparent substance 143 so that the focal-length of the variable focal-length lens 140 is changed. Also, the circuit 103 includes a power supply, a variable resistor, and switch. When the transparent substance 143 is deformed, pressure is applied to the fluid or jelly-like substance 144 through a cylinder 146 so that the fluid or jelly-like substance 144 is also deformed, following the deformation of the transparent substance 143.

Thus, according to the example, even when the object distance is changed, focusing can be performed without moving the imaging optical system with a motor, and as such the example excels in compact and lightweight design and low power consumption.

Again, in FIG. 44, reference numerals 145a and 145b denote transparent electrodes and numeral 146 denotes a cylinder for storing a fluid or jelly-like substance 144. For the transparent substance 143, high-polymer piezoelectrics such as polyurethane, silicon rubber, acrylic elastomer, PZT, PLZT, and PVDF; vinylidene cyanide co-polymer; or copolymer of vinylidene fluoride and trifluoroethylene is used.

The use of an organic substance, synthetic resin, or elastomer, having a piezoelectric property, brings about a considerable deformation of the surface of the variable focal-length lens 140, which is favorable. It is good practice to use a transparent piezoelectric substance for the transparent substance 143 of the variable focal-length lens 140.

Figure 46:
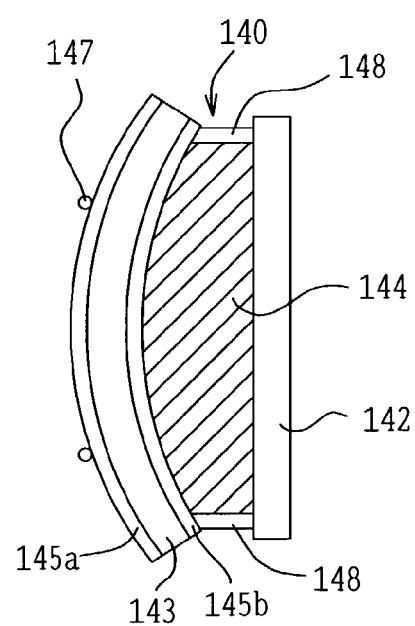
FIG. 46 is an explanatory view showing a state where the variable focal-length lens of FIG. 45 is deformed.

In FIG. 44, instead of using the cylinder 146, the variable focal-length lens 140, as shown in FIG. 46, may be designed to use supporting members 147 and a deformable member 148 for enclosing the fluid or jelly-like substance 144 on the peripheral side.

Figure 45:
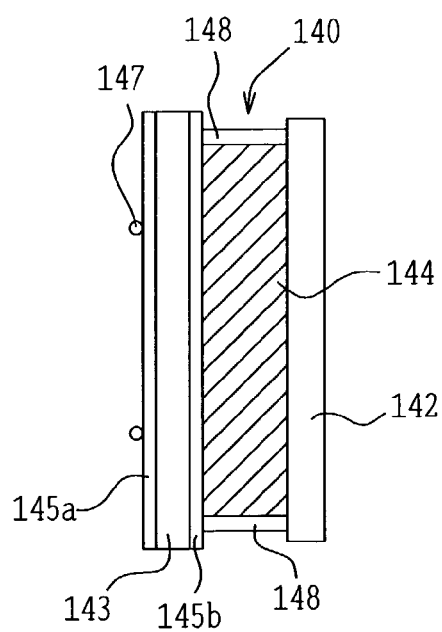
FIG. 45 is an explanatory view showing a modified example of the variable focal-length lens of FIG. 44.

The supporting members 147 are composed of annular members fixed at a constant distance with respect to the transparent member 142. The substance 144 hermetically sealed with the transparent member 142, the electrode 142b, and the member 148 is situated between the supporting members 147 and the transparent member 142 and is deformed, following the deformation of the transparent substance 143 sandwiched between the pair of transparent electrodes 145a and 145b. The periphery of the transparent substance 143 is sealed. According to the example, even when the voltage is applied to the transparent substance 143 through the transparent electrodes 145a and 145b and thereby the transparent substance 143 is deformed, as shown in FIG. 45, the deformable member 148 is deformed so that the entire volume of the fluid or jelly-like substance 144 remains unchanged. As such, the cylinder 146 becomes unnecessary. Also, in FIGS. 45 and 46, the deformable member 148 is made with an elastic body, accordion-shaped synthetic resin, or metal.

In each of the examples shown in FIGS. 44 and 46, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 47:
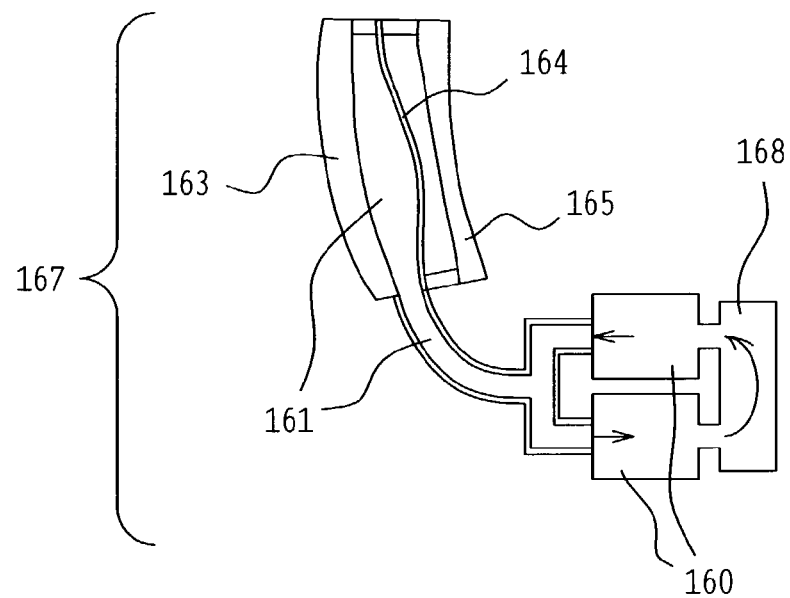
FIG. 47 is a view schematically showing another example of the variable focal-length lens in which a fluid is taken in and out by the micropump to deform a lens surface.

FIG. 47 shows a variable focal-length lens 167 in which the fluid 161 is taken in and out by micropumps 160 to deform the lens surface, in another example of the variable focal-length lens.

Each of the micropumps 160 is a small-sized pump, for example, made by a micromachining technique and is constructed so that it is operated with an electric power. The fluid 161 is sandwiched between a transparent substrate 163 and a transparent elastic body 164. The elastic body 164 constitutes a lens surface deformed by the fluid 161. In FIG. 47, reference numeral 165 represents a transparent substrate for protecting the elastic body 164, but this substrate is not necessarily required.

As examples of pumps made by the micromachining technique, there are those which use thermal deformations, piezoelectric substances, and electrostatic forces.

It is also possible to use two micropumps, each of which is the micropump 180 shown in FIG. 32, for example, as in the micropumps 160 used in the variable focal-length lens 167 of FIG. 47. In this construction, when the fluid 161 is run by the drive of the micropumps 160 to deform the elastic body 164, the shape of the lens surface is changed and the focus position can be varied with respect to light passing through the transparent substrate 163, the fluid 161, and the elastic body 164.

In the variable focal-length lens which uses the electrostatic force or the piezoelectric effect, a high voltage is sometimes required for drive. In this case, it is desirable that the boosting transformer or the piezoelectric transformer is used to constitute the control system. When a laminated piezoelectric transformer is particularly used, a compact design is achieved.

Figure 48:
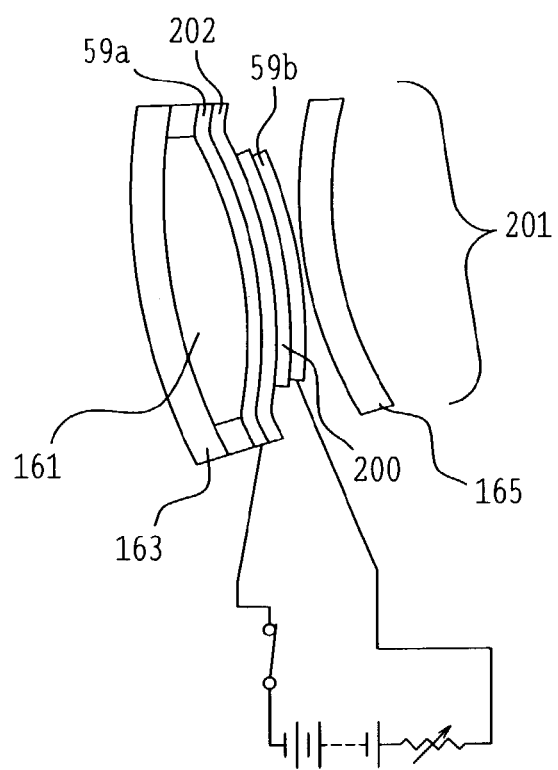
FIG. 48 is a view schematically showing another example of the variable optical-property element which is the variable focal-length lens using a piezoelectric substance.

FIG. 48 shows a variable focal-length lens 201 using a piezoelectric substance 200, instead of using the elastic body 164 of FIG. 47, in another example of a variable optical-property element. In this example, the fluid 161 is enclosed between the transparent substrate 161 and a transparent 59a.

The same substance as the transparent substance 143 is used for the piezoelectric substance 200, which is provided on a soft transparent substrate 202. It is desirable that synthetic resin or an organic substance is used for the substrate 202.

In the example, the voltage is applied to the piezoelectric substance 200 through the two transparent electrodes 59a and 59b, and thereby the piezoelectric substance 200 is deformed so that the function of a convex lens is exercised in FIG. 48.

Figure 49:
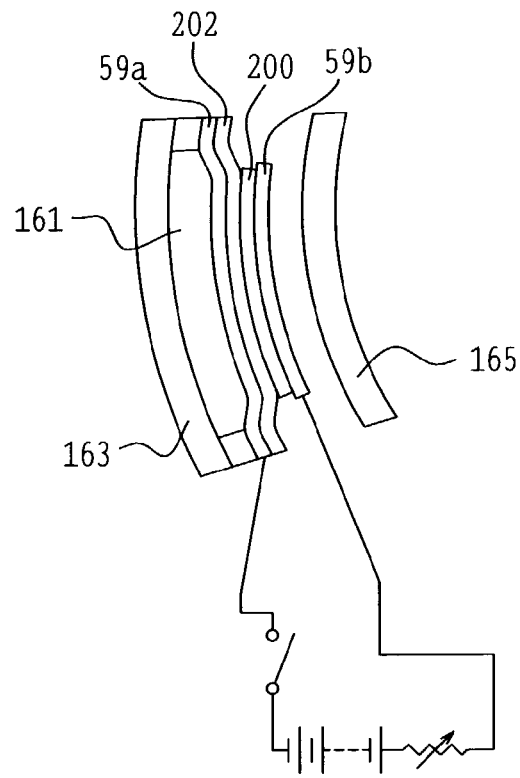
FIG. 49 is an explanatory view showing a state where the variable focal-length lens of FIG. 48 is deformed.

The substrate 202 is previously configured into a convex form, and at least one of the two transparent electrodes 59a and 59b is caused to differ in size from the substrate 202, for example, the electrode 59b is made smaller than the substrate 202. In doing so, when the applied voltage is removed, the opposite preset portions of the two transparent electrodes 59a and 59b, as shown in FIG. 49, are deformed into concave shapes so as to have the function of a concave lens, acting as the variable focal-length lens.

In this case, since the substrate 202 is deformed so that the volume of the fluid 161 is not changed, there is the merit that the liquid tank 168 becomes unnecessary.

This example has a great merit that a part of the substrate 202 holding the fluid 161 is deformed by the piezoelectric substance and the liquid tank 168 is dispensed with.

The transparent substrates 163 and 165 may be constructed as lenses or plane surfaces, although the same may be said of the example of FIG. 47.

Figure 50:
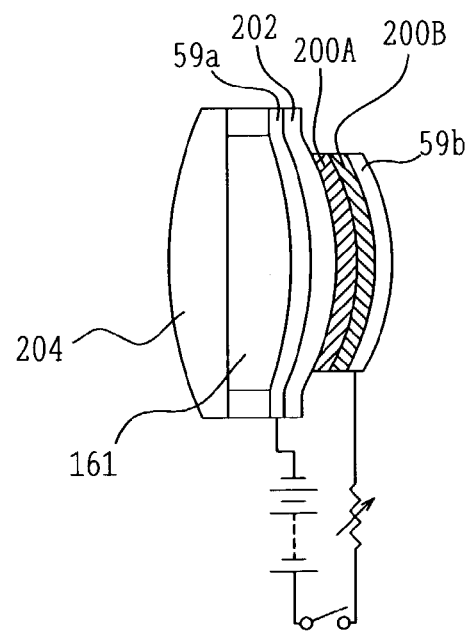
FIG. 50 is a view schematically showing still another example of the variable optical-property element which is the variable focal-length lens using two thin plates constructed of piezoelectric substances.

FIG. 50 shows a variable focal-length lens using two thin plates 200A and 200B constructed of piezoelectric substances, in replacement of the piezoelectric substance 200 of FIG. 49, in still another example of the variable optical-property element.

The variable focal-length lens of this example has the merit that the thin plate 200A and the thin plate 200B, reversed in direction of the piezoelectric substance, are used and thereby the amount of deformation is increased so that a wide variable focal-length range can be obtained. Also, in FIG. 50, reference numeral 204 denotes a lens-shaped transparent substrate and 161 denotes a fluid. Even in the example, the transparent electrode 59b on the right side of the figure is configured to be smaller than the substrate 202.

In the examples of FIGS. 48–50, the thicknesses of the substrate 202, the piezoelectric substance 200, and the thin plates 200A and 200B may be rendered uneven so that a state of deformation caused by the application of the voltage is controlled. By doing so, lens aberration can be corrected, which is convenient.

Figure 51:
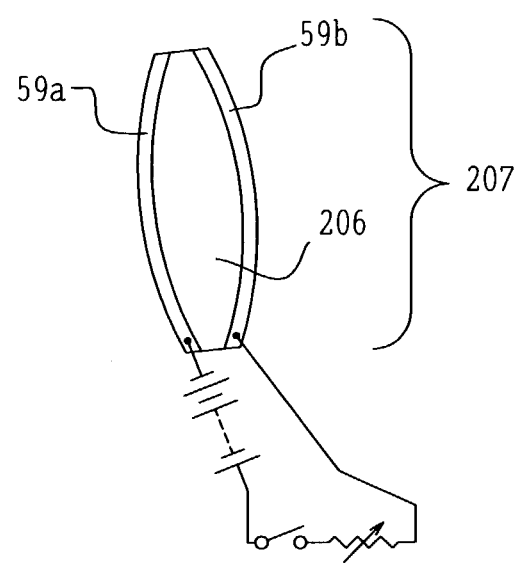
FIG. 51 is a view schematically showing still another example of the variable focal-length lens.

FIG. 51 shows another example of the variable focal-length lens. A variable focal-length lens 207 of this example has an electrostrictive substance 206 such as silicon rubber or acrylic elastomer between the pair of the transparent electrodes 59a and 59b.

Figure 52:
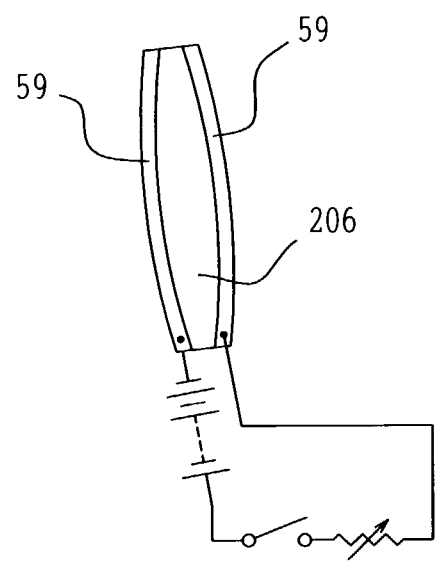
FIG. 52 is an explanatory view showing the deformation of the variable focal-length lens of FIG. 51.

According to the example, when the voltage is low, the electrostrictive substance 206, as depicted in FIG. 51, expands at the middle portion and acts as a convex lens, while when the voltage is increased, the electrostrictive substance 206, as depicted in FIG. 52, expands in a vertical direction and contracts in a lateral direction, and thus the focal length is increased. In this way, the electrostrictive substance 206 operates as the variable focal-length lens.

According to the variable focal-length lens of the example, there is the merit that since a large power supply is not required, power consumption is minimized.

The feature common to the variable focal-length lenses of FIGS. 44–52 mentioned above is that the shape of the medium acting as a lens is changed and thereby a variable focal length can be obtained. Such variable focal-length lenses, in contrast with those in which the refractive index is changed, have the merit that a variable focal-length range or a lens size can be arbitrarily chosen.

Figure 53:
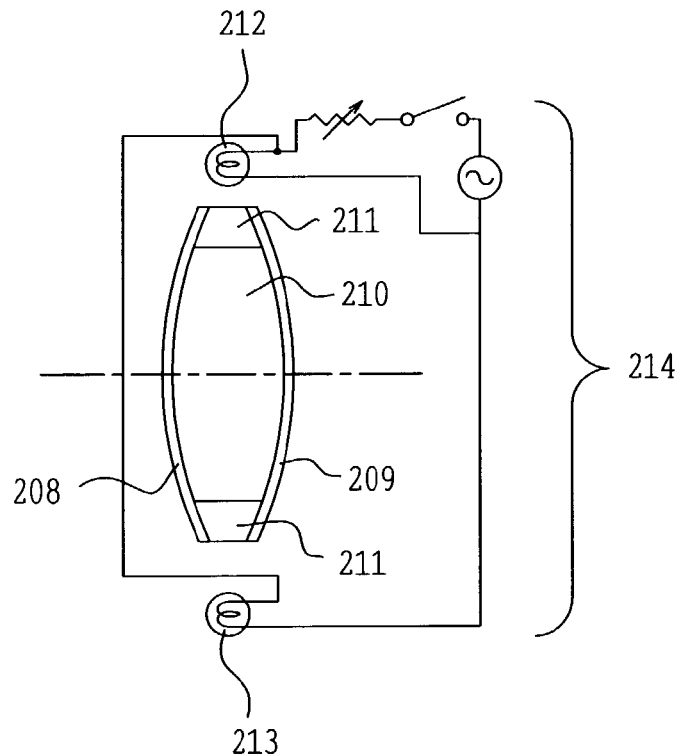
FIG. 53 is a view schematically showing a further example of the variable optical-characteristic element which is the variable focal-length lens using a photonical effect.

FIG. 53 shows a variable focal-length lens using a photomechanical effect in a further example of the variable optical-property element. A variable focal-length lens 214 of this example is designed so that azobenzene 210 is sandwiched between transparent elastic bodies 208 and 209 and is irradiated with light through a transparent spacer 211.

In FIG. 53, reference numerals 212 and 213 represent light sources, such as LEDs or semiconductor lasers, of central wavelengths $\lambda_1$ and $\lambda_2$, respectively.

Figure 54A:
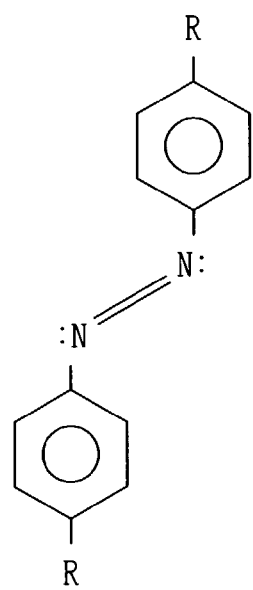
FIGS. 54A and 54B are explanatory views showing the structures of trans-type and cis-type azobenzene, respectively, used in the variable focal-length lens in FIG. 53.
Figure 54A:
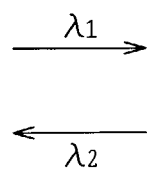
Figure 54B:
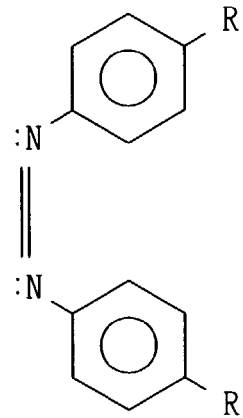

In the example, when trans-type azobenzene shown in FIG. 54A is irradiated with light of the central wavelength $\lambda_1$, the azobenzene 210 changes to cis-type azobenzene shown in FIG. 54B to reduce its volume. Consequently, the thickness of the variable focal-length lens 214 is decreased, and the function of the convex lens is impaired.

On the other hand, when the cis-type azobenzene is irradiated with light of the central wavelength $\lambda_2$, the azobenzene 210 changes from the cis-type to the trans-type azobenzene to increase the volume. Consequently, the thickness of the variable focal-length lens 214 is increased, and the function of the convex lens is improved.

In this way, the optical element 214 of the example acts as the variable focal-length lens. In the variable focal-length lens 214, since the light is totally reflected at the interface between each of the transparent elastic bodies 208 and 209 and air, the light does not leak through the exterior and high efficiency is obtained.

Figure 55:
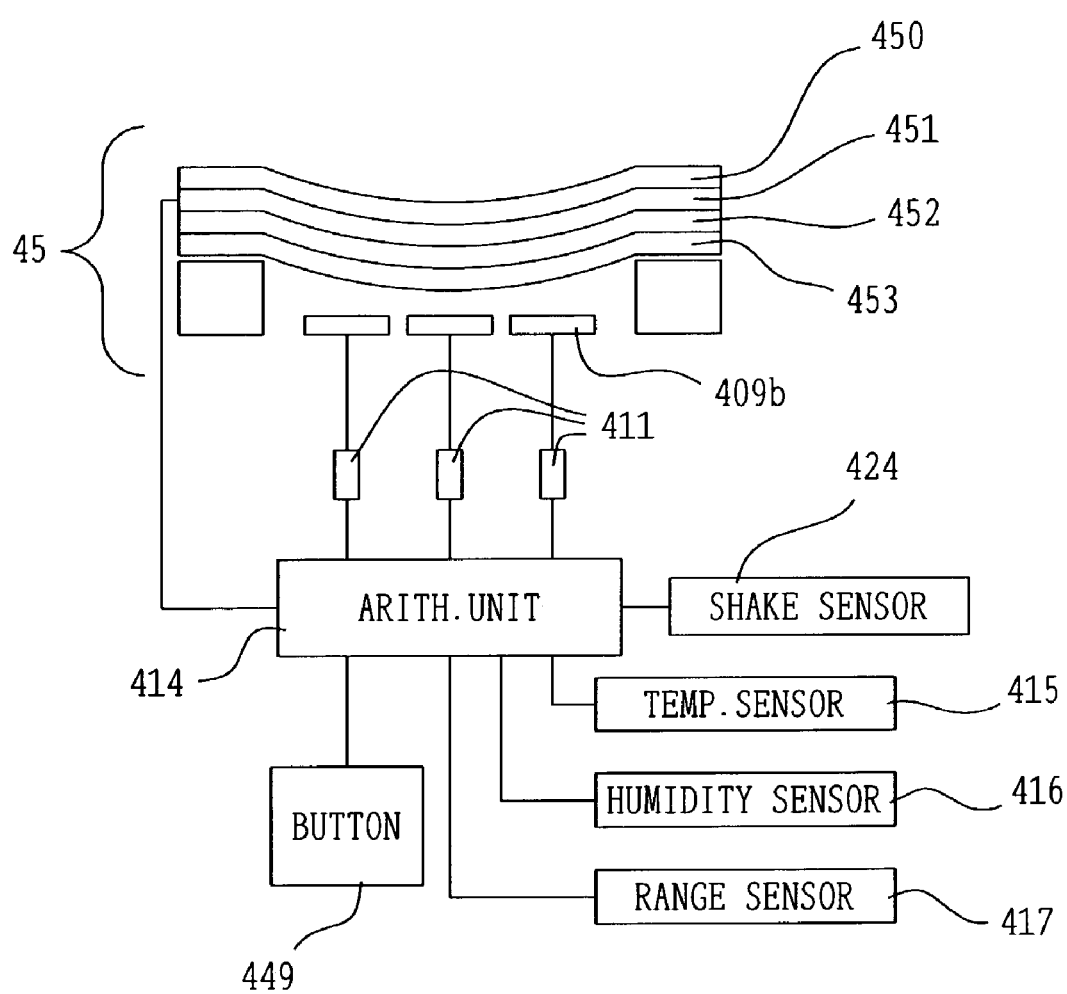
FIG. 55 is a view schematically showing another example of the deformable mirror.

FIG. 55 shows another embodiment of the deformable mirror. This example is described on the assumption that the deformable mirror is used in the digital camera. Again, in FIG. 55, reference numeral 411 designates the variable resistors; 414, the arithmetical unit; 415, the temperature sensor; 416, the humidity sensor; 417, the range sensor; and 424, the shake sensor. A deformable mirror 45 of the example is such that a plurality of divided electrodes 409b are spaced away from an electrostrictive substance 453 including an organic substance such as acrylic elastomer, on which an electrode 452 and a deformable substrate 451 are placed in turn, and a reflecting film 450 including metal, such as aluminum, for reflecting incident light is provided on the substrate 451. Thus, the deformation layer of the deformable mirror 45 has a four-layer structure.

The deformable mirror, when constructed as mentioned above, has the merit that the surface profile of the reflecting film (reflecting surface) 450 becomes smooth and it is hard to produce aberration, in contrast to the case where the divided electrodes 409b and the electrostrictive substance 453 are integrally constructed. Also, the deformable substrate 451 and the electrode 452 may be arranged in reverse order.

In FIG. 55, reference numeral 449 stands for a button for changing the magnification of the optical system or zooming. The deformable mirror 45 is controlled through the arithmetical unit 414 so that a user pushes the button 449 and thereby the reflecting film 450 can be deformed to change the magnification or zoom. Also, instead of the electrostrictive substance including an organic substance such as acrylic elastomer, the piezoelectric substance such as barium titanate, already mentioned, may be used.

The combination of image processing (enhancement, shading correction, and correction for distortion) and the closing-up lens or the electrostatic motor which has been described so far is applicable to the optical device using the variable optical-property element, not to speak of the optical device using the variable mirror. In the above discussion, the image pickup device has been chiefly mentioned, but the image processing of the present invention is also applicable to the optical device, such as the observation device of FIG. 7 or the display device.

Also, although said in common with the deformable mirrors described above, it is desirable that the shape where the portion of deformation of the reflecting surface is viewed from a direction perpendicular to the reflecting surface is long along the direction of the incident plane of an axial ray, for example, elliptical, oval, or polygonal. This is because the deformable mirror, as in FIG. 39, is often used in a state where a ray of light is incident at a grazing angle. In order to suppress aberration produced in this case, it is desirable that the reflecting surface has a shape similar to ellipsoid of revolution, paraboloid of revolution, or hyperboloid of revolution. This s because it is desirable that in order to deform the reflecting surface of the deformable mirror into such a shape, the shape where the portion of deformation of the reflecting surface is viewed from a direction perpendicular to the reflecting surface is long along the direction of the incident plane of an axial ray.

In the present invention, it is assumed that the image sensor, the display element or the field frame of the observation optical system is called an image element. The optical device refers to the optical system or the device including optical elements and its part, and includes an image pickup device, an observation device, a display device, an illumination device, and a signal processing device.

The image pickup device refers to, for example, a film camera, a digital camera, a digital camera for cellular phones, a robot's eye, a lens-exchangeable digital single-lens reflex camera, a TV camera, an image pickup device of a cellular phone, an image pickup device of a PDA, an on-vehicle camera, a moving-picture recorder, an electronic moving-picture recorder, a camcorder, a VTR camera, or an electronic endoscope. Any of the digital camera, a card digital camera, the TV camera, an image pickup device of a cellular phone, an image pickup device of a PDA, an on-vehicle camera, the VTR camera, and a moving-picture recording camera is an example of an electronic image pickup device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a cellular phone.

The illumination device includes, for example, a stroboscopic lamp for cameras, a headlight for cars, a light source for endoscopes, or a light source for microscopes.

The signal processing device refers to, for example, a cellular phone, a personal computer, a game machine, a read/write device for optical disks, or an arithmetic unit for optical computers.

The image sensor refers to, for example, a CCD, a pickup tube, a solid-state image sensor, or a photographing film. The variable optical-property element includes a variable focal-length lens, a deformable mirror, a deflection prism whose surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element. In the above discussion, the variable mirror has been chiefly described, but when there is the merit even though the variable mirror is replaced with an ordinary mirror, the present invention also includes this case.

What is claimed is:

1. An optical apparatus comprising: a variable optical-characteristic element; and a drive circuit for driving the variable optical-characteristic element, the optical apparatus having an image processing function, wherein enhancement is performed in accordance with a diffraction state and variations in aberration of an optical system.

2. An apparatus according to claim 1, wherein the stronger enhancement is performed along with increasing of an F-number of the optical system.

3. An apparatus according to claim 1, wherein the stronger enhancement is performed along with moving of a zoom state of the optical system from a wide-angle state to a telephoto state.

4. An apparatus according to claim 1, wherein the stronger enhancement is performed when a distance to an object is small.

5. An optical apparatus comprising:
a variable optical-characteristic element; and
a drive circuit for driving the variable optical-characteristic element, the optical apparatus having an image processing function,
wherein enhancement is performed in accordance with an optical-deflection function of the variable optical-characteristic element by estimating the optical-deflection function of the variable optical-characteristic element from driving information of the variable optical-characteristic element.

6. An optical apparatus comprising:
a variable optical-characteristic element; and
a drive circuit for driving the variable optical-characteristic element, the optical apparatus having an image processing function, wherein different enhancement is performed on each part of images in accordance with symmetry of an optical system.

7. An optical apparatus according to claim 6, wherein the optical system is rotationally asymmetrical.

8. An optical apparatus comprising:
a movable optical element or optical element group;
an actuator driven by an electrostatic force for driving the optical element or optical element group; and
a variable optical-characteristic element.

9. An apparatus according to claim 8, further comprising a light emitting element.

10. An apparatus according to claim 8, further comprising a power supply used for in common to the variable optical-characteristic element and the light emitting element, or common to the actuator, the variable optical-characteristic element, and the light emitting element.

11. An optical apparatus comprising:
a variable optical-characteristic element; and
a drive circuit for driving the variable optical-characteristic element,
wherein shading is corrected by image processing.

12. An apparatus according to claim 11, further comprising an decentered optical system.

13. An apparatus according to claim 11, further comprising a zoom optical system.

14. An optical apparatus comprising any one of a variable optical-characteristic element, an decentered image pickup element, an decentered display element, and an optical element having an decentered optical element,
wherein shading is corrected by image processing.

15. An optical apparatus comprising:
a variable optical-characteristic element; and
a drive circuit for driving the variable optical-characteristic element,
wherein distortion of images is corrected by image processing.

16. An apparatus according to claim 15, comprising a plurality of variable optical characteristic elements.

17. An apparatus according to claim 15, further comprising a zoom optical system.

18. An apparatus according to claim 15, further comprising a free-curved surface prism.

19. An optical apparatus comprising:
a variable optical-characteristic element;
a drive circuit for driving the variable optical -characteristic element;
an image pickup element;
a closing-up lens; and
a cover for protecting an imaging optical system,
wherein the closing-up lens and the cover for protecting an imaging optical system are detachably arranged in front of the image pickup element.

20. A variable optical-characteristic element comprising a deformable film comprising a reflection surface for reflecting light and a substrate for supporting the reflection surface, wherein the substrate is meshed.

21. A variable optical-characteristic element comprising a deformable film comprising a reflection surface for reflecting light and a substrate for supporting the reflection surface,
wherein part of the substrate where an electrode is formed is meshed.

22. An element according to claim 21, wherein part of the substrate where an electrode is formed is made of a metal.

23. An element according to claim 21, wherein part of the substrate where an electrode is formed is made of an organic conductor or an organic semiconductor.

24. An optical apparatus comprising:
an optical system for performing variable power by one lens group or integrated lens groups;
a variable optical-characteristic element;
a drive circuit for driving the variable optical-characteristic element; and
a picture element,
wherein the picture element is fixed based on the steps of:
when an object having a known distance is arranged, feeding drive information to the variable optical-characteristic element in accordance with the distance;
photographing images of the object; and
adjusting the position of the picture element so as to substantially maximize the contrast of the images.

25. An apparatus according to claim 24, further comprising a memory for memorizing the drive information obtained by carrying out the steps of:
examining focus displacement by changing a zoom state;
finely adjusting a moving original point of the lens group so as to substantially minimize the difference between the focus displacement and focus displacement in design;
photographing again a predetermined object having a known distance; and
changing drive information applied to the variable optical-characteristic element so as to substantially maximize the contrast,
wherein the variable optical-characteristic element is driven by the drive information memorized in the memory.

26. An apparatus according to claim 24, further comprising:
a look-up table; and
a memory for memorizing the drive information obtained by carrying out the steps of:
examining focus displacement by changing a zoom state;
finely adjusting a moving original point of a lens group so as to substantially minimize the difference between the focus displacement and focus displacement in design;
photographing again an object having a known distance; and
selecting drive information for driving the variable optical-characteristic element from the look-up table so as to substantially maximize the contrast,
wherein the variable optical -characteristic element is driven by the drive information memorized in the memory.

27. An apparatus according to claim 24, wherein the picture element is fixed based on the steps of:
examining focus displacement by further changing a zoom state; and
finely adjusting a moving original point of the lens group so as to substantially minimize the difference between the focus displacement and focus displacement in design.

28. A manufacturing method of an optical apparatus comprising an optical system for performing variable power by one lens group or integrated lens groups; a variable optical-characteristic element; a drive circuit for driving the variable optical-characteristic element; and a picture element, the method comprising the steps of:
when an object having a known distance is arranged, feeding drive information to the variable optical-characteristic element in accordance with the distance;
photographing images of the object; and
adjusting and fixing the position of the picture element so as to substantially maximize the contrast of the images.

29. A method according to claim 28, further comprising the steps of:
  examining focus displacement by changing a zoom state;
  finely adjusting a moving original point of a lens group so as to substantially minimize the difference between the focus displacement and focus displacement in design;
  photographing an object having a known distance again;
  changing drive information applied to the variable optical-characteristic element so as to substantially maximize the contrast;
  memorizing the drive information at that time in a memory; and
  controlling the variable optical-characteristic element with the memorized value.

30. A method according to claim 28, further comprising the steps of:
  examining focus displacement by changing a zoom state;
  finely adjusting a moving original point of a lens group so as to substantially minimize the difference between the focus displacement and focus displacement in design;
  photographing an object having a known distance again;
  selecting drive information for driving the variable optical-characteristic element from an LUT so as to substantially maximize the contrast;
  memorizing the drive information at that time in a memory; and
  controlling the variable optical-characteristic element with the memorized value.

31. A method according to claim 28, further comprising the steps of:
  examining focus displacement by changing a zoom state; and
  finely adjusting a moving original point of a lens group so as to substantially minimize the difference between the focus displacement and focus displacement in design.

32. An optical apparatus comprising:
  a variable optical-characteristic element; and
  a driving circuit for driving the variable optical-characteristic element, the optical apparatus having an image processing function;
  wherein shading is corrected by image processing in accordance with symmetry of an optical system.

33. An optical apparatus according to claim 32, wherein the optical system is rotationally asymmetrical.

34. An optical apparatus comprising:
  a variable optical-characteristic element; and
  a driving circuit for driving the variable optical-characteristic element, the optical apparatus having an image processing function,
  wherein distortion is corrected by image processing in accordance with symmetry of an optical system.

35. An optical apparatus according to claim 34, wherein the optical system is rotationally asymmetrical.

36. An optical apparatus comprising:
  a variable optical-characteristic element; and
  a drive circuit for driving the variable optical-characteristic element,
  the optical apparatus having an image processing function,
  wherein different enhancement is performed on each part of images in accordance with symmetry of an optical system.

37. An optical apparatus according to claim 36, wherein the optical system is rotationally asymmetric.

* * * * *

UNITED STATES PATENT AND TRADEMARK OFFICE
CERTIFICATE OF CORRECTION

PATENT NO. : 7,031,071 B2  
APPLICATION NO. : 10/413209  
DATED : April 18, 2006  
INVENTOR(S) : Kimihiko Nishioka Page 1 of 1

It is certified that error appears in the above-identified patent and that said Letters Patent is hereby corrected as shown below:

| Column | Line | |
|---|---|---|
| 12 | 67 | Change "ALPTE" to -- APIE --; |
| 13 | 2 | Change "ceneral" to -- general --; and |
| 16 | 27 | Change "degraditon" to -- degradation --. |

Signed and Sealed this

Thirtieth Day of January, 2007

JON W. DUDAS  
*Director of the United States Patent and Trademark Office*